US011427663B1

(12) United States Patent
Liang et al.

(10) Patent No.: US 11,427,663 B1
(45) Date of Patent: Aug. 30, 2022

(54) ETHYLENE-VINYL ALCOHOL COPOLYMER RESIN COMPOSITION AND MULTI-LAYER STRUCTURE COMPRISING THEREOF

(71) Applicant: CHANG CHUN PETROCHEMICAL CO., LTD., Taipei (TW)

(72) Inventors: Chih Chieh Liang, Taipei (TW); Wen Hsin Lin, Taipei (TW)

(73) Assignee: CHANG CHUN PETROCHEMICAL CO., LTD., Taipei (TW)

( * ) Notice: Subject to any disclaimer, the term of this patent is extended or adjusted under 35 U.S.C. 154(b) by 0 days.

(21) Appl. No.: 17/570,539

(22) Filed: Jan. 7, 2022

(51) Int. Cl.
| | |
|---|---|
| *C08F 216/06* | (2006.01) |
| *C08J 5/18* | (2006.01) |
| *C09J 7/24* | (2018.01) |
| *B32B 1/02* | (2006.01) |
| *B32B 7/12* | (2006.01) |
| *B32B 27/08* | (2006.01) |
| *B32B 27/30* | (2006.01) |
| *B32B 27/32* | (2006.01) |
| *C08L 29/04* | (2006.01) |

(52) U.S. Cl.
CPC .............. *C08F 216/06* (2013.01); *B32B 1/02* (2013.01); *B32B 7/12* (2013.01); *B32B 27/08* (2013.01); *B32B 27/306* (2013.01); *B32B 27/308* (2013.01); *B32B 27/32* (2013.01); *C08J 5/18* (2013.01); *C08L 29/04* (2013.01); *C09J 7/243* (2018.01); *C09J 7/245* (2018.01); *B32B 2250/05* (2013.01); *B32B 2250/24* (2013.01); *B32B 2250/40* (2013.01); *B32B 2307/7244* (2013.01); *B32B 2307/732* (2013.01); *C08J 2329/04* (2013.01); *C08L 2205/025* (2013.01); *C09J 2423/106* (2013.01); *C09J 2429/006* (2013.01)

(58) Field of Classification Search
CPC ........ C08F 216/06; C08J 5/18; C08J 2329/04; C09J 7/243; C09J 7/245; C09J 2429/006; C09J 2423/106; B32B 7/12; B32B 27/08; B32B 27/306; B32B 27/308; B32B 27/32; B32B 2307/732; B32B 2250/05; B32B 2250/24; B32B 2250/40; C08L 29/04
USPC ....................................................... 428/35.7
See application file for complete search history.

(56) References Cited

U.S. PATENT DOCUMENTS

| | | | |
|---|---|---|---|
| 2001/0025087 | A1 | 9/2001 | Kazeto et al. |
| 2002/0055440 | A1 | 5/2002 | Balasubramaniam |
| 2003/0139303 | A1 | 7/2003 | Scharf et al. |
| 2005/0009987 | A1 | 1/2005 | Hara et al. |
| 2005/0215733 | A1 | 9/2005 | Tsai et al. |
| 2005/0228129 | A1 | 10/2005 | Tsai et al. |
| 2006/0094811 | A1 | 5/2006 | Kim et al. |
| 2006/0251836 | A1 | 11/2006 | Jonas et al. |
| 2008/0269091 | A1 | 10/2008 | Devlin et al. |
| 2012/0237742 | A1 | 9/2012 | Tai et al. |
| 2012/0237747 | A1 | 9/2012 | Tai et al. |
| 2017/0183493 | A1* | 6/2017 | Okamoto ................. C08K 3/32 |
| 2017/0313825 | A1 | 11/2017 | Yang et al. |
| 2018/0371229 | A1 | 12/2018 | Sato et al. |
| 2020/0010591 | A1 | 1/2020 | Chang et al. |
| 2020/0087504 | A1* | 3/2020 | Usui ..................... B32B 27/288 |
| 2020/0299435 | A1 | 9/2020 | Anida et al. |
| 2020/0392364 | A1 | 12/2020 | Morikawa et al. |
| 2021/0024729 | A1 | 1/2021 | Jun et al. |
| 2021/0108111 | A1 | 4/2021 | Tanida et al. |
| 2021/0316920 | A1 | 10/2021 | Ito |
| 2021/0317286 | A1* | 10/2021 | Komuro ................. B32B 27/34 |

FOREIGN PATENT DOCUMENTS

| | | | | |
|---|---|---|---|---|
| CN | 1264914 | C * | 7/2006 | ............... C08K 3/32 |
| CN | 1264914 | C | 7/2006 | |
| CN | 105899340 | B * | 1/2019 | ............... B29B 9/12 |
| CN | 105899340 | B | 1/2019 | |

* cited by examiner

*Primary Examiner* — Michael M. Bernshteyn
(74) *Attorney, Agent, or Firm* — Polsinelli PC

(57) ABSTRACT

The present disclosure provides ethylene-vinyl alcohol copolymer resin compositions, and multilayer structure comprising the ethylene-vinyl alcohol copolymer resin compositions with uniform thickness.

18 Claims, 2 Drawing Sheets

ETHYLENE-VINYL ALCOHOL COPOLYMER RESIN COMPOSITION AND MULTI-LAYER STRUCTURE COMPRISING THEREOF

FIELD OF THE INVENTION

The present disclosure generally relates to ethylene-vinyl alcohol copolymer resin compositions, and a multi-layer structure comprising the ethylene-vinyl alcohol copolymer resin compositions.

BACKGROUND OF THE INVENTION

Ethylene-vinyl alcohol (EVOH) resin compositions are widely used in laminates for preserving perishable items. For example, EVOH resin compositions and laminates are commonly used by the food packaging industry, medical device and supplies industry, pharmaceutical industry, electronics industry, and agricultural chemicals industry. EVOH resin compositions are often incorporated as a distinct layer within a laminate to serve as an oxygen-barrier layer.

Laminates having a distinct EVOH layer are typically produced by coextruding EVOH resin compositions with other types of polymers. EVOH resin composition exhibits rheological properties similar to other resins allowing it to be coextruded with polyolefins, polyamides, nylons, polystyrenes, polyvinyl chlorides, polyesters, and thermoplastic polyurethanes using conventional extrusion equipment. EVOH resin compositions, however, often exhibit poor adhesion to other polymers, including, e.g., some of the above polymers. Thus, adhesive resins, called "tie resins" are used to bond the EVOH layer to an adjacent layer in co-extrusion. Some nylons and thermoplastic polyurethanes, however, will adhere directly to EVOH resin composition without the use of tie resin.

EVOH copolymers having a lower ethylene content usually provide a better degree of crystallization and better gas-barrier properties, but typically provide inferior mechanical properties. Conversely, EVOH copolymers having a higher ethylene content usually provide better mechanical properties but provide inferior gas-barrier properties.

There is also a continued need for EVOH resin compositions that provide improved oxygen-barrier properties and improved mechanical properties.

FIGURES

Figure 1:
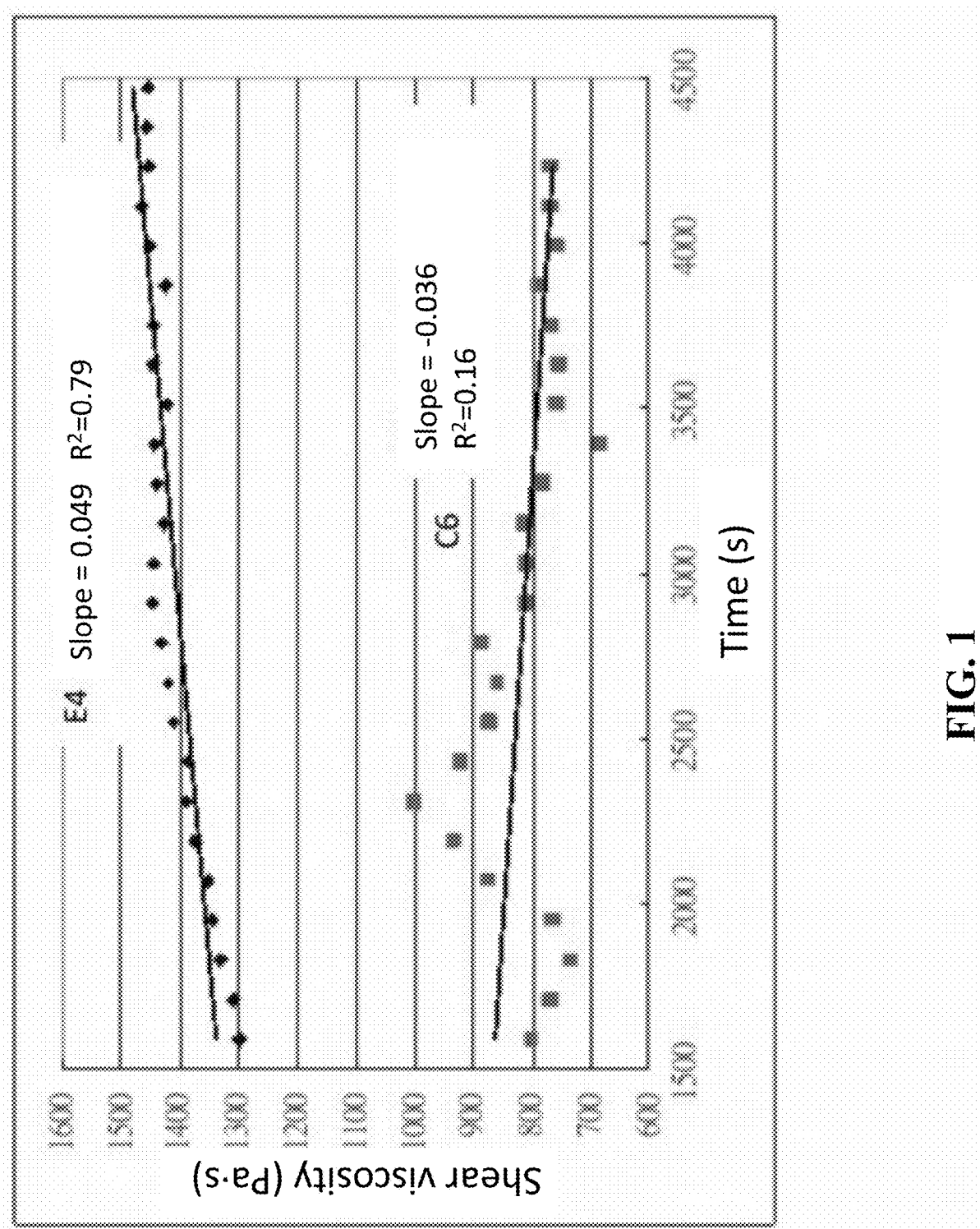

FIG. 1 represents the coefficient of determination ($R^2$) of EVOH copolymer resin compositions of Example EVOH 4 and Comparative EVOH 6 which plots the shear viscosity versus time, wherein the EVOH resin copolymer composition was tested by rheometer under 210° C. and shear rate of 99 $s^{-1}$. The coefficient of determination ($R^2$) of regression line of Example EVOH 4 is larger than or equal to 0.5 and less than or equal to 1. When the $R^2$ becomes closer to 1, the shear viscosity becomes more stable and the thickness of the film thereof becomes uniform.

Figure 2:
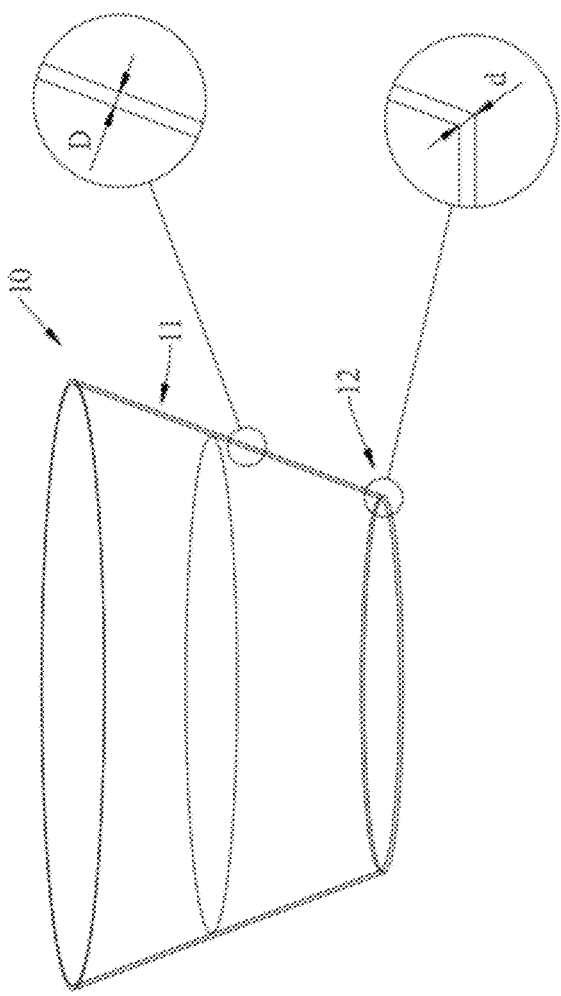

FIG. 2 represents a schematic diagram of multi-layer container thermoformed from Example EVOHs 1-6 and Comparative EVOHs 1-7.

SUMMARY OF THE INVENTION

In one aspect, disclosed herein, are ethylene-vinyl alcohol (EVOH) copolymer resin compositions, wherein the ethylene-vinyl alcohol copolymer resin composition has a coefficient of determination of viscosity; and wherein the coefficient of determination of the viscosity is 0.5 to 1 at a shear rate of 99 $s^{-1}$ and a temperature of 210° C.

In yet another aspect, disclosed herein, are multi-layer structures. The multi-layer structures comprise (a) a layer formed from an EVOH copolymer resin composition; (b) a polymer layer formed from a polymer other than the EVOH copolymer resin composition; and (c) an adhesive layer; wherein the adhesive layer is disposed between the layer formed from the ethylene-vinyl alcohol copolymer resin composition and the polymer layer.

Other features and iterations of the invention are described in more detail below.

DETAILED DESCRIPTION OF THE INVENTION

In one aspect, the present disclosure provides ethylene-vinyl alcohol (EVOH) copolymer resin compositions. These EVOH copolymer resin compositions comprise a first ethylene-vinyl alcohol copolymer and a second ethylene-vinyl alcohol copolymer. The EVOH copolymer resin compositions may optionally comprise additional ethylene-vinyl alcohol copolymers, a third ethylene-vinyl alcohol copolymer. The EVOH copolymer resin compositions have a coefficient of determination of viscosity. This coefficient of determination of the viscosity ranges from 0.5 to 1 at a shear rate of 99 $s^{-1}$ and a temperature of 210° C. The viscosity of the ethylene-vinyl alcohol copolymer resin composition at a temperature of 210° C. and a shear rate of 99 $s^{-1}$ is plotted over a time period from about 1500 seconds to about 4500 seconds and has a slope of regression line from about −1 to about 1. With these attributes, the film made from the ethylene-vinyl alcohol copolymer resin compositions has a better uniform thickness and improved oxygen barrier properties as compared to the one made from other ethylene-vinyl alcohol copolymer resin composition.

(I) Ethylene-Vinyl Alcohol (EVOH) Copolymer Resin Compositions

The present disclosure encompasses ethylene-vinyl alcohol (EVOH) copolymer resin compositions comprising a first ethylene-vinyl alcohol copolymer and a second ethylene-vinyl alcohol copolymer. In some embodiments, the ethylene-vinyl alcohol (EVOH) copolymer resin compositions comprise a third ethylene-vinyl alcohol (EVOH) copolymer.

In general, the EVOH copolymer resin compositions comprise a first ethylene content of the first ethylene-vinyl alcohol copolymer and a second ethylene content of the second ethylene-vinyl alcohol copolymer. As appreciated by the skilled artisan, the first and second ethylene contents in the EVOH copolymer resin composition can and will vary. In one embodiment, the first ethylene content may be the same as the second ethylene content and the ethylene content may be from about 20 mole % to about 65 mole %. In another embodiment, the first ethylene content may be different from the second ethylene content. In an additional embodiment, the EVOH copolymer resin composition comprises a third EVOH copolymer. The third EVOH copolymer contributes a third ethylene content. The third ethylene content may be the same or different from the first ethylene content of the first ethylene-vinyl alcohol copolymer and the second ethylene content of the second ethylene-vinyl alcohol copolymer.

Generally, the first ethylene content of the first ethylene-vinyl alcohol copolymer may be from about 20 mole % to about 48 mole %. In various embodiments, the first ethylene content may be from about 22 mole % to about 48 mole %, from about 23 mole % to about 48 mole %; from about 24 mole % to about 48 mole %, from about 32 mole % to about 48 mole %, from about 20 mole % to about 35 mole %, from about 21 mole % to about 35 mole %, from about 22 mole % to about 35 mole %, from about 23 mole % to about 35 mole %; from about 24 mole % to about 35 mole %, from about 25 mole % to about 35 mole %, from about 26 mole % to about 35 mole %, from about 27 mole % to about 35 mole %; from about 28 mole % to about 35 mole %, from about 29 mole % to about 35 mole %, from about 30 mole % to about 35 mole %, from about 31 mole % to about 35 mole %, from about 32 mole % to about 35 mole %, from about 33 mole % to about 35 mole %, or from about 34 mole % to about 35 mole % including any ranges or subranges there between.

In general, the second ethylene content of the second ethylene-vinyl alcohol copolymer may be from about 36 mole % to about 65 mole %. In various embodiments, the second ethylene content may be from 36 mole % to about 65 mole %, from about 37 mole % to about 65 mole %, from about 38 mole % to about 65 mole %, from about 39 mole % to about 65 mole %; from about 40 mole % to about 65 mole %, from about 41 mole % to about 65 mole %, from about 43 mole % to about 65 mole %, from about 45 mole % to about 65 mole %; from about 48 mole % to about 65 mole %, from about 50 mole % to about 65 mole %, from about 52 mole % to about 65 mole %, from about 55 mole % to about 65 mole %, from about 58 mole % to about 65 mole %, from about 60 mole % to about 65 mole %, or from about 63 mole % to about 65 mole % including any ranges or subranges there between.

The EVOH copolymer resin compositions have a coefficient of determination of viscosity. This coefficient of determination of viscosity is measured at a temperature of 210° C. and a shear rate of 99 s$^{-1}$. The temperature and shear rate were set to simulate the situation in the extruder while processing the EVOH copolymer resin compositions. The temperature of 210° C. and the shear rate of 99 s$^{-1}$ are the most common situation to process the EVOH copolymer resin compositions. This data is plotted over a time period from about 1500 seconds to about 4500 seconds. The time period of about 1500 seconds to about 4500 seconds is the stable situation while processing. In this time period, the EVOH copolymer resin compositions are melted totally and can behave the intrinsic rheological properties of EVOH copolymer resin compositions. Generally, the slope of the regression line of this plot is from −1 to 1. In various embodiments, the slope of the regression line of this plot may be −1, −0.9, −0.8, −0.7, −0.6, −0.5, −0.4, −0.3, −0.2, −0.1, 0, 0.1, 0.2, 0.3, 0.4, 0.5, 0.6, 0.7, 0.8, 0.9 or 1 including any ranges or subranges there between. In one embodiment, the slope of the regression line from the plot is from −0.5 to 0.5.

In general, the EVOH copolymer resin compositions have a melt flow rate from about 1.0 g/10 min to about 10.0 g/10 min. In various embodiments, the ethylene-vinyl alcohol copolymer resin compositions have a melt flow rate from about 1.0 g/10 min to about 9.0 g/10 min, from about 1.0 g/10 min to about 6.0 g/10 min, from about 3.0 g/10 min to about 10.0 g/10 min, from about 3.0 g/10 min to about 6.0 g/10 min, from about 3.5 g/10 min to about 5.5 g/10 min, from about 4.0 g/10 min to about 5.0 g/10 min, or from about 4.2 g/10 min to about 4.8 g/10 min including any ranges or subranges there between.

As appreciated by the skilled artisan, the amount of boron content in the EVOH copolymer resin compositions is dependent of the specific EVOH copolymer utilized, the concentration of the boron in the solution, and the duration of the EVOH copolymer in contact with the boron solution. Generally, the EVOH copolymer resin compositions have a boron content from about 5 ppm (parts per million) to about 300 ppm. In various embodiments, the EVOH copolymer resin compositions have a boron content from about 5 ppm to about 300 ppm, from about 50 ppm to about 250 ppm, from about 100 ppm to about 200 ppm, or from about 125 pm to about 175 ppm including any ranges or subranges there between.

In general, the EVOH copolymer resin compositions have an alkali metal content from about 5 ppm (parts per million) to about 300 ppm. In various embodiments, the ethylene-vinyl alcohol copolymer resin compositions have an alkali metal content from about 5 ppm to about 300 ppm, from about 50 ppm to about 250 ppm, from about 100 ppm to about 200 ppm, or from about 125 pm to about 175 ppm including any ranges or subranges there between.

The EVOH copolymer resin compositions could be in the form of pellet. When the pellets are cylindrical or elliptical cylindrical, the height can be 1.5-5.0 mm, 1.7-5.0 mm, 2.2-5.0 mm, 2.4-5.0 mm, 2.6-5.0 mm, 2.8-5.0 mm, 3.0-5.0 mm, 3.2-5.0 mm, 3.4-5.0 mm, 3.6-5.0 mm, 3.8-5.0 mm, 4.0-5.0 mm, 1.7-4.5 mm, 1.7-4.4 mm, 1.7-4.2 mm, 1.7-4.0 mm, 1.7-3.8 mm, 1.7-3.6 mm, 1.7-3.4 mm, 1.7-3.2 mm, or 1.7-3.0 mm; and the long axis of its cross-sectional area can be 1.5-5.0 mm, 1.7-5.0 mm, 2.2-5.0 mm, 2.4-5.0 mm, 2.6-5.0 mm, 2.8-5.0 mm, 3.0-5.0 mm, 3.2-5.0 mm, 3.4-5.0 mm, 3.6-5.0 mm, 3.8-5.0 mm, 4.0-5.0 mm, 1.7-4.5 mm, 1.7-4.4 mm, 1.7-4.2 mm, 1.7-4.0 mm, 1.7-3.8 mm, 1.7-3.6 mm, 1.7-3.4 mm, 1.7-3.2 mm, or 1.7-3.0 mm.

When the pellets are in the round particle shape, the round particle shape can be round shape, elliptical shape, or Go-shape, where the maximum outer diameter of the pellet is taken as the long side, and the maximum diameter in the cross section with the largest area in the cross section perpendicular to the long side is taken as the short side. The long side can be 1.5-5.0 mm, 2.2-5.0 mm, 2.4-5.0 mm, 2.6-5.0 mm, 2.8-5.0 mm, 3.0-5.0 mm, 3.2-5.0 mm, 3.4-5.0 mm, 3.6-5.0 mm, 3.8-5.0 mm, 4.0-5.0 mm, 2.0-4.5 mm, 2.0-4.4 mm, 2.0-4.2 mm, 2.0-4.0 mm, 2.0-3.8 mm, 2.0-3.6 mm, 2.0-3.4 mm, 2.0-3.2 mm, or 2.0-3.0 mm; and the short side can be 1.5-5.0 mm, 1.8-4.6 mm, 2.4-4.6 mm, 2.6-4.6 mm, 2.8-4.6 mm, 3.0-4.6 mm, 3.2-4.6 mm, 3.4-4.6 mm, 3.6-4.6 mm, 3.8-4.6 mm, 4.0-4.6 mm, 1.6-4.5 mm, 1.6-4.4 mm, 1.6-4.2 mm, 1.6-4.0 mm, 1.6-3.8 mm, 1.6-3.6 mm, 1.6-3.4 mm, 1.6-3.2 mm, or 1.6-3.0 mm.

The EVOH copolymer resin compositions which comprise two EVOH copolymers have a first melting point and a second melting point. As appreciated by the skilled artisan, with the inclusion of a third EVOH copolymer, a third melting point would be present.

Generally, the first melting point ranges from about 140° C. to about 215° C. In various embodiments, the first melting point ranges from about 140° C. to about 200° C., from about 170° C. to about 215° C., from about 180° C. to about 210° C., from about 190° C. to about 205° C., or from about 195° C. to about 200° C. including any ranges or subranges in between.

In general, the second melting point ranges from about 135° C. to about 200° C. In various embodiments, the second melting point ranges from about 135° C. to about 190° C., from about 140° C. to about 180° C., from about 150° C. to about 175° C., or from about 160° C. to about 170° C. including any ranges or subranges in between.

Without being limited to a specific theory, the inventors discovered that when the ranges of the at least two melting points are out of the foregoing preferable ranges or the ethylene contents of the EVOH copolymers forming the EVOH copolymer resin composition or pellet thereof are too different or too close, which may result in poor miscibility and/or result in inferior characteristics for a thermoformed multi-layer formed therefrom. For example, if the ethylene contents of the EVOH copolymers forming the EVOH copolymer resin composition or pellet thereof are too close, multi-layer structures thermoformed from the EVOH copolymer resin composition or pellet thereof may have inferior characteristics.

The EVOH copolymer resin compositions provide some unique properties since these EVOH copolymer resin compositions are prepared from two or more EVOH copolymers. For example, with two or more ethylene contents, the ethylene-vinyl alcohol copolymer resin compositions, after formation of a film, have an improved uniform thickness of the film and enhanced oxygen barrier properties.

(II) Methods for Preparing the EVOH Copolymer Resin Composition

Another aspect of the present disclosure encompasses methods for preparing the EVOH copolymer resin composition. The methods comprise: (a) preparing a first ethylene-vinyl acetate (EVAc) copolymer; (b) saponifying the first EVAc copolymer to form a first ethylene-vinyl alcohol (EVOH) copolymer intermediate; (c) pelletizing the first EVOH copolymer intermediate to form first EVOH copolymer intermediate pellets; (d) contacting the first ethylene-vinyl alcohol copolymer intermediate pellets with a first solution comprising an alkali metal to form a first ethylene-vinyl alcohol copolymer; (e) preparing a second ethylene-vinyl acetate (EVAc) copolymer; (f) saponifying the second ethylene-vinyl acetate copolymer to form a second EVOH copolymer intermediate; (g) pelletizing the second EVOH copolymer intermediate to form second EVOH copolymer intermediate pellets; (h) contacting the second EVOH copolymer intermediate pellets with a second solution comprising an alkali metal to form the second ethylene-vinyl alcohol copolymer; and (i) contacting the first EVOH copolymer and the second EVOH copolymer by solution blending to form an EVOH copolymer resin composition precursor; (j) drying the ethylene-vinyl alcohol copolymer resin composition precursor to form the EVOH copolymer resin composition or (k) further compounding to form the EVOH copolymer resin composition. The first solution and/or the second solution may comprise boron compound. As appreciated by the skilled artisan, one or more additional EVOH copolymers, each of the copolymers could be obtained by steps such as steps (a) through (d), may be added in step (i) to form the EVOH copolymer resin composition precursor.

(a) Preparing a First Ethylene-Vinyl Acetate (EVAc) Copolymer

The first step, step (a), in the method commences by preparing the first ethylene-vinyl acetate (EVAc) copolymer. In this step, a vinyl acetate monomer is contacted with a polymerization catalyst, an organic acid, and a non-aqueous polar solvent under an atmosphere of ethylene while stirring. After a degree of polymerization is achieved, the polymerization is quenched.

A variety of polymerization catalysts, such as peroxide polymerization catalyst, can be used in this step. Non-limiting examples may be AIBN (azobisisobutylnitrile), benzoyl peroxide, di-t-butyl peroxide, diacetyl peroxide, hydrogen peroxide or lauroyl peroxide. In one embodiment, the peroxide polymerization catalyst is diacetyl peroxide.

In general, the weight ratio of the polymerization catalyst to the vinyl acetate monomer may range from about 0.00002:1.0 to about 0.0002:1.0. In various embodiments, the weight ratio of the polymerization catalyst to the vinyl acetate monomer may range from about 0.00002:1.0 to about 0.0002:1.0, from about 0.00004:1.0 to about 0.0001:1.0, or from about 0.00006:1.0 to about 0.00009:1.0 including any ranges or subranges there between.

A wide variety of organic acids may be utilized in step (a) of the process. Non-limiting examples of suitable acids may be formic acid, acetic acid, propionic acid, lactic acid, oxalic acid, uric acid, malic acid, citric acid, or tartaric acid. In one embodiment, the useful organic acid used in the polymerization reaction is citric acid.

Generally, the weight ratio of the vinyl acetate monomer to the organic acid may range from about 500,000:1.0 to about 5,000:1.0. In various embodiments, the weight ratio of the vinyl acetate monomer to the organic acid may range from about 500,000:1.0 to about 5,000:1.0, from about 100,000:1.0 to about 10,000:1.0, or from about 75,000:1.0 to about 25,000:1.0 including any ranges or subranges there between. In one embodiment, weight ratio of the vinyl acetate monomer to the organic acid may be about 30,000:1.0.

A wide variety of non-aqueous polar solvents may be used in the process. Non-limiting examples of suitable non-aqueous polar solvents may be methanol, ethanol, propanol, i-propanol, n-butanol, dimethylformamide (DMF), dimethyl acetamide (DMAc), dimethylsulfoxide (DMSO), or combinations thereof. In one embodiment, a suitable non-aqueous polar solvent may be methanol.

In general, the weight ratio of the vinyl acetate monomer to the non-aqueous polar solvent may range from about 20.0:1.0 to about 0.1:1.0. In various embodiments, the weight ratio of the vinyl acetate monomer to the non-aqueous polar solvent may range from about 20.0:1.0 to about 0.1:1.0, from about 10.0:1.0 to about 1.0:1.0, or from about 8.0:1.0 to about 2.0:1.0 including any ranges or subranges there between. In one embodiment, the weight ratio of the vinyl acetate monomer to the non-aqueous polar solvent may be about 5.0:1.0.

The contacting of the vinyl acetate monomer, the polymerization catalyst, the organic acid, and the non-aqueous polar solvent may be initially conducted under an inert atmosphere such as helium, argon, nitrogen, or a combination thereof. After these reagents used in the step (a) are combined and stirred (forming either a homogeneous or a heterogeneous mixture), the inert atmosphere is replaced with an atmosphere of ethylene. The ethylene is incorporated into the polymerization reaction to form the ethylene-vinyl acetate copolymer.

Generally, the pressure of the ethylene gas in the polymerization reaction may range from about 10 kg/cm$^2$ to about 60 kg/cm$^2$. In various embodiments, the pressure of the ethylene gas in the polymerization reaction may range from about 10 kg/cm$^2$ to about 60 kg/cm$^2$, from about 25 kg/cm$^2$ to about 50 kg/cm$^2$, or from about 35 kg/cm$^2$ to about 45 kg/cm$^2$ including any ranges or subranges there between.

Once the reagents used in the polymerization are combined, stirred, and the ethylene gas is introduced, the reaction mixture is heated to a specific temperature to initiate the polymerization. In general, the temperature of the polymerization may range from about 30° C. to about 100° C. In various embodiments, the temperature of the polymerization may range from about 30° C. to about 100° C., from about 40° C. to about 90° C., from about 50° C. to about 80° C., or from about 60° C. to about 70° C. including any ranges or subranges there between. In one embodiment, the temperature of the polymerization may be about 67° C.

The polymerization is allowed to proceed until a degree of polymerization is achieved. Generally, the polymerization is allowed to proceed until about 50% of the degree of polymerization is achieved. In various embodiments, the polymerization is allowed to proceed until about 50%, about 60%, about 70%, about 80%, about 90%, or about 95% of the degree of polymerization is achieved. In an embodiment, the polymerization is allowed to proceed until about 60% of the degree of polymerization is achieved.

The time that the polymerization is conducted can and will vary depending on the components of the polymerization reaction, the concentration of the components, the pressure of the ethylene gas in the polymerization, and the degree of polymerization. In general, the time that the polymerization is conducted may be at least 2 hours. In various embodiments, the time that the polymerization is conducted may be about 2 hours, about 2.5 hours, about 3 hours, about 3.5 hours, about 4 hours, about 4.5 hours, about 5 hours, about 5.5 hours, about 6 hours, about 6.5 hours, about 7 hours, about 7.5 hours, about 8 hours, or more than 8 hours. In one embodiment, the time that the polymerization is conducted is about 6 hours.

Once the appropriate degree of polymerization is achieved, an inhibitor is introduced in the polymerization to stop the polymerization. A wide variety of inhibitors may be used in this step. Non-limiting examples of suitable inhibitor may be 4-methoxyphenol, butylated hydroxy toluene, hydroquinone, 2-methylbutanoic acid, pentanedioic acid, adipic acid, sorbic acid, salicyclic acid, or cinnamic acid. In one embodiment, the inhibitor used in step (a) is sorbic acid.

Generally, the weight ratio of the inhibitor to the vinyl acetate monomer may range from about 0.001:1.0 to about 0.00001:1.0. In various embodiments, the weight ratio of the inhibitor to the vinyl acetate monomer may range from about 0.001:1.0 to about 0.00001:1.0, from about 0.0008:1.0 to about 0.00002:1.0, from about 0.0005:1.0 to about 0.00005:1.0, or from about 0.0002:1.0 to about 0.00008:1.0 including any ranges or subranges there between.

Once the polymerization has ceased, the ethylene content in the ethylene-vinyl acetate copolymer is measured.

In general, the ethylene content in the EVAc copolymer may range from 20 mole % to about 35 mole %. In various embodiments, the ethylene content in the ethylene-vinyl acetate copolymer may range from 20 mole % to about 35 mole %, from about 20 mole % to about 30 mole %, or from 20 mole % to about 25 mole % including any ranges or subranges there between.

In order to provide a suitable EVAc copolymer to be useful in the next step, the remaining vinyl acetate monomer needs to be removed from the polymerization mixture. One method useful in achieving this removal encompasses azeotropic distillation of the unreacted vinyl acetate monomer and a solvent. Useful solvents are described above. In one embodiment, the solvent is methanol.

The polymerization mixture is introduced into a distillation tower. The distillation may be conducted under atmospheric pressure or reduced pressure. In one embodiment, the distillation may be conducted under atmospheric pressure. Methanol and the vinyl acetate monomer are removed from the distillation tower. The methanol, as a vapor, is introduced back into the distillation tower while the vinyl acetate monomer is collected and reused. Additional methanol may be introduced into the lower portion of the distillation tower to maintain the level of the solvent and remove the remaining vinyl acetate monomer. Methods are known in the art to accurately measure the amount of the vinyl acetate monomer remains in the polymerization reaction.

After the distillation is completed, the EVAc copolymer may have a yield at least 30%. In various embodiments, the yield of the ethylene-vinyl acetate copolymer may be at least 30%, at least 40%, at least 50%, at least 60%, or greater than 60% including any ranges or subranges there between.

(b) Saponifying the First Ethylene-Vinyl Acetate (EVAc) Copolymer to Form a First Ethylene-Vinyl Alcohol (EVOH) Copolymer Intermediate The next step in the method, step (b), comprises saponifying the first EVAc copolymer to form the first EVOH copolymer intermediate by contacting the first ethylene-vinyl acetate copolymer with an alkali metal base or an alkali earth metal base, a basic catalyst, or combinations thereof.

A wide variety of alkali metal bases, alkali earth metal bases, or basic catalysts may be used in this step. Non-limiting examples of suitable bases may be lithium hydroxide, lithium carbonate, sodium hydroxide, sodium bicarbonate, sodium carbonate, potassium hydroxide, potassium bicarbonate, potassium carbonate, tetraethylammonium hydroxide, tetrabutylammonium hydroxide, or an aqueous solution of ammonia.

The alkali metal base, the alkali earth metal base, the basic catalyst, or combinations thereof may be added into the saponification reaction as a solid or an aqueous solution.

The weight ratio of the alkali metal base, the alkali earth metal base, the basic catalyst, or combinations thereof to the ethylene-vinyl acetate copolymer may range from about 0.01:1.0 to about 1.0:1.0. In various embodiments, the weight ratio of the alkali metal base, the alkali earth metal base, the basic catalyst, or combinations thereof to the ethylene-vinyl acetate copolymer may range from about 0.01:1.0 to about 1.0:1.0, from about 0.08:1.0 to about 0.8:1.0, or from about 0.1:1.0 to about 0.5:1.0.

The weight ratio of the alkali metal base, the alkali earth metal base, the basic catalyst, or combinations thereof to the aqueous solution may range from about 1:5 to about 1:20. In various embodiments, weight ratio of the alkali metal base, the alkali earth metal base, the basic catalyst, or combinations thereof to the aqueous solution may range from about 1:5 to about 1:20, from about 1:8 to about 1:16, or from about 1:10 to about 1:12.

The saponification is conducted in an aqueous solution. Generally, the solution comprises a non-aqueous polar solvent and water. A list of non-aqueous polar solvents is listed above. In one embodiment, the suitable non-aqueous polar solvent is methanol.

The concentration of the aqueous solution can vary. In general, the volume percentage of the non-aqueous polar solvent to water may be about 99.0:1.0 to about 1.0:99.0. In various embodiments, the volume percentage of the non-aqueous polar solvent to water may be about 99.0:1.0 to about 1.0:99.0, from about 75.0:25.0 to about 25.0:75.0, or from about 60.0:40.0 to about 40.0:60.0 including any ranges or subranges there between. In one embodiment, the volume percentage of the non-aqueous polar solvent to water can vary. The volume percentage of the non-aqueous polar solvent to water may be about 60.0:40.0.

The temperature of the saponification may range from about room temperature (~23° C.) to about 80° C. In various embodiments, the temperature of the saponification may range from about 30° C. to about 80° C., from 40° C. to about 75° C., or from about 50° C. to about 70° C. In one embodiment, the temperature of the saponification may be about 60° C.

The duration of the saponification can and will vary depending on the amount of the ethylene-vinyl acetate copolymer, the alkali metal base, the alkali earth metal base, the basic catalyst, or combinations thereof utilized, the amount of the non-aqueous polar solvent and water used, and the temperature. In general, the duration of the saponification may range from about 30 minutes to about 6 hours. In various embodiments, the duration of the saponification may range from about 30 minutes to about 6 hours, from about 30 minutes to about 4 hours, or from about 30 minutes to about 2 hours. In an embodiment, the duration of the saponification at 60° C. may be about 1 hour.

The first ethylene-vinyl alcohol copolymer intermediate may have a solid content ranging from about 20 wt. % to about 60 wt. %. In various embodiments, the first ethylene-vinyl alcohol copolymer intermediate may have a solid content ranging from about 20 wt. % to about 60 wt. %, from about 25 wt. % to about 55 wt. %, or from about 30 wt. % to about 50 wt. % including any ranges or subranges there between.

(c) Pelletizing the First EVOH Copolymer Intermediate to Form First EVOH Copolymer Intermediate Pellets The next step in the process is to pelletize the first EVOH copolymer intermediate. This step utilizes underwater pelletization. The mixture from the previous step is introduced into a feeding tube in the underwater pelletizer. Specifically, the mixture of the EVOH copolymer intermediate, containing methanol and water, was pumped into the feeding tube with a flow rate of 120 L/min. The mixture was transferred to an inlet pipe, which had a diameter of 2.8 mm, cut by a rotating knife at a speed of 1,500 rpm, and then cooled by adding water having a temperature of 5° C. and subsequently centrifuged, so as to produce EVOH copolymer intermediate pellets from the prepared EVOH copolymer intermediates.

(d) Contacting the First EVOH Copolymer Intermediate Pellets with a First Solution Comprising an Alkali Metal to Form the First EVOH Copolymer The next step in the method comprises contacting the first EVOH copolymer intermediate pellets with a first solution comprising an alkali metal to form the first EVOH copolymer. In this method step, the EVOH copolymer intermediate pellets are initially washed with water and then the EVOH copolymer intermediate is immersed in a first solution comprising an alkali metal salt forming the first ethylene-vinyl alcohol copolymer. In an embodiment, the first solution comprising an alkali metal is initially prepared and the first EVOH copolymer intermediate pellets are immersed in the solution.

Optionally, the first solution comprising an alkali metal may further comprise a boron compound. Various boron compounds and alkali metal salts may be used. The boron compounds may, in some instances, include boric acid or a metal salt thereof. Non-limiting examples of the suitable metal salts include, but are not limited to, calcium borate, cobalt borate, zinc borate (e.g. zinc tetraborate, zinc metaborate), potassium aluminum borate, ammonium borate (e.g. ammonium metaborate, ammonium tetraborate, ammonium pentaborate, ammonium octaborate), cadmium borate (e.g. cadmium orthoborate, cadmium tetraborate), potassium borate (e.g. potassium metaborate, potassium tetraborate, potassium pentaborate, potassium hexaborate, potassium octaborate), silver borate (e.g. silver metaborate, silver tetraborate), copper borate (e.g. copper (II) borate, copper metaborate, copper tetraborate), sodium borate (e.g. sodium metaborate, sodium diborate, sodium tetraborate, sodium pentaborate, sodium hexaborate, sodium octaborate), lead borate (e.g. lead metaborate, lead hexaborate), nickel borate (e.g. nickel orthoborate, nickel diborate, nickel tetraborate, nickel octaborate), barium borate (e.g. barium orthoborate, barium metaborate, barium diborate, barium tetraborate), bismuth borate, magnesium borate (e.g. magnesium orthoborate, magnesium diborate, magnesium metaborate, trimagnesium tetraborate, pentamagnesium tetraborate), manganese borate (e.g. manganese (I) borate, manganese metaborate, manganese tetraborate), lithium borate (e.g. lithium metaborate, lithium tetraborate, lithium pentaborate), salts thereof, or combinations thereof. Borate mineral such as borax, inyoite, kotoite, suanite, and szaibelyite may be included. In an embodiment, the boron compound in the first solution is borax, boric acid or sodium borate such as sodium metaborate, sodium diborate, sodium tetraborate, sodium pentaborate, sodium hexaborate, and sodium octaborate.

Various alkali metal compounds can be used. Non-limiting examples of alkali metal compounds may be the alkali metal salt including lithium, sodium, or potassium, with sodium and potassium being preferred. Non-limiting examples of the alkali metal salt include aliphatic carboxylic acid salts, aromatic carboxylic acid salts, carbonates, hydrochlorides, nitrates, sulfates, phosphates, or metal complexes of lithium, sodium or potassium and the like. Among these, sodium acetate, potassium acetate, sodium carbonate, potassium carbonate, sodium phosphate and potassium phosphate are preferred.

In case that the first solution comprises both a boron compound and an alkali metal, in general, the amount of the boron compound in the first solution comprising a boron compound and an alkali metal ranges from about 100 mg/L to about 1000 mg/L. In various embodiments, the amount of the boric acid in the first solution comprising a boron compound and an alkali metal ranges from about 100 mg/L to about 1000 mg/L, from about 150 mg/L to 750 mg/L, or from about 200 mg/L to about 500 mg/L.

Generally, the weight ratio of the first solution comprising a boron compound and an alkali metal to the EVOH copolymer intermediate pellets may range from about 0.6:1 to about 2.0:1, or about 0.8:1 to about 1.8:1.

In case that the first solution comprises both a boron compound and an alkali metal, in general, the amount of the alkali salt in the first solution comprising a boron compound and an alkali metal ranges from about 100 mg/L to about 1000 mg/L. In various embodiments, the amount of the sodium acetate in the first solution comprising a boron compound and an alkali metal ranges from about 100 mg/L to about 1000 mg/L, from about 150 mg/L to about 750 mg/L, or from about 200 mg/L to about 500 mg/L.

Methods are known in the art to determine the specific amount of the boron compound and alkali metal in the first EVOH copolymer.

Generally, the first ethylene content in the first EVOH copolymer may range from about 20 mole % to about 48 mole %. In various embodiments, the first ethylene content in the EVOH copolymer may range from about 20 mole % to about 35 mole %, from about 20 mole % to about 30 mole %, or from about 20 mole % to about 25 mole % including any ranges or subranges there between.

The max/min MFR of the first EVOH copolymer may range from 1.0 to 1.5 as measured by the MFR measuring method (ISO 1133-1) using a Dynisco LNI 5000 where a 2160 g sample was measured at a temperature of 210° C. for 10 minutes. In various embodiments, the max/min MFR of the first EVOH copolymer may be 1.1, 1.2, 1.3, 1.4 or 1.5.

(e) Preparing a Second EVOH Copolymer

The next step in the method, step (e), encompasses preparing the second EVAc copolymer. This step is disclosed in step (a) of the method disclosed above.

In general, the second ethylene content in the second EVAc copolymer may range from about 36 mole % to about 65 mole %. In various embodiments, the second ethylene content in the second EVAc copolymer may range from about 36 mole % to about 65 mole %, from about 40 mole % to about 60 mole %, or from 40 mole % to about 50 mole % including any ranges or subranges there between.

(f) Saponifying the Second EVAc Copolymer to Form a Second EVOH Copolymer Intermediate The next step in the method, step (f), encompasses saponifying the second EVAc copolymer to form a second EVOH copolymer intermediate. This step is disclosed in step (b) of the method disclosed above.

The EVOH copolymer intermediate may have a solid content ranging from about 20 wt % to about 60 wt %. In various embodiments, the EVOH copolymer intermediate may have a solid content ranging from about 20 wt % to about 60 wt %, from about 25 wt % to about 55 wt %, or from about 30 wt % to about 50 wt % including any ranges or subranges there between.

(g) Pelletizing the Second EVOH Copolymer Intermediate to Form Second EVOH Copolymer Intermediate Pellets.

The next step in the method, step (g), comprises pelletization of the second EVOH copolymer intermediate. This step is disclosed in step (c) as disclosed above.

(h) Contacting the Second EVOH Copolymer Intermediate Pellets with a Second Solution Comprising an Alkali Metal to Form the Second Ethylene-Vinyl Alcohol Copolymer.

The next step in the method, step (h), comprises contacting the second EVOH copolymer intermediate pellets with a second solution comprising an alkali metal forming the second EVOH copolymer. Optionally, the second solution comprising an alkali metal may further comprise a boron compound. This step is disclosed in step (d) as disclosed above.

Generally, the second ethylene content in the second EVOH copolymer may range from about 36 mole % to about 65 mole %. In various embodiments, the second ethylene content in the second ethylene-vinyl alcohol copolymer may range from about 36 mole % to about 65 mole %, from about 40 mole % to about 60 mole %, or from 45 mole % to about 60 mole % including any ranges or subranges there between.

(i) Contacting the First EVOH Copolymer and the Second EVOH Copolymer by Solution Blending to Form an EVOH Copolymer Resin Composition Precursor The next step in the method, step (i), comprises contacting the first EVOH copolymer and the second EVOH copolymer. This contacting step may be performed by solution blending in water. For the solution blending, separate solutions of the first EVOH copolymer and the second EVOH copolymer were prepared and then combined into one solution.

The weight ratio of the first EVOH copolymer or the second EVOH copolymer to water may range from about 0.1:1.0 to about 10.0:1.0. In various embodiments, the weight ratio of the first EVOH copolymer or the second EVOH copolymer to water may range from about 0.1:1.0 to about 10.0:1.0, from about 0.5:1.0 to about 5.0:1.0, or from about 0.75:1.0 to about 1.25:1.0 including any ranges or subranges there between. In one embodiment, the weight ratio of the first EVOH copolymer or the second EVOH copolymer to water may be about 1.0:1.0.

Various weight ratios of the first EVOH copolymer to the second EVOH copolymer may be used to form the EVOH copolymer resin composition precursor. In general, the weight ratio of the first EVOH copolymer to the second EVOH copolymer may range from about 90:10 to about 50:50. In various embodiments, the weight ratio of the first EVOH copolymer to the second EVOH copolymer may range from about 90:10 to about 50:50, from about 80:20 to about 60:40, or from about 75:25 to about 70:30 including any ranges or subranges there between.

The mixing of the first EVOH copolymer and the second EVOH copolymer forms the ethylene-vinyl alcohol copolymer resin composition precursor.

(j) Drying the EVOH Copolymer Resin Composition Precursor to Form the EVOH Copolymer Resin Composition or (k) Further Compounding to Form the EVOH Copolymer Resin Composition The last step in the process, step (j) or step (k), encompasses drying the EVOH copolymer resin composition precursor forming the EVOH copolymer resin composition or (k) further compounding to form the EVOH copolymer resin composition.

For solution compounding, the solutions were combined, mixed, and then dried.

Generally, the duration of mixing the EVOH copolymer resin composition precursor comprising the first EVOH copolymer and the second EVOH copolymer may range from about 10 minutes to about 6 hours to ensure the mixture is homogeneous. In various embodiments, the duration of mixing may range from about 10 minutes to about 6 hours, from about 30 minutes to about 2 hours, or from about 45 minutes to about 1.5 hours. In one embodiment, the duration of mixing is about 1 hour.

In general, the temperature of mixing may range from about 10° C. to about 30° C. In various embodiments, the temperature of mixing may range from about 10° C. to about 30° C., from about 15° C. to about 25° C., or room temperature (~23° C.).

After mixing the solution to form the EVOH copolymer resin composition precursor, the EVOH copolymer resin composition precursor is dried to prepare the EVOH copolymer resin composition. This step may occur under reduced pressure or atmospheric pressure.

Generally, the temperature of drying the EVOH copolymer resin composition precursor may range from about 100° C. to about 220° C. In various embodiments, the temperature of drying the EVOH copolymer resin composition precursor may range from about 100° C. to about 220° C., from about 120° C. to about 200° C., or from about 150° C. to about 180° C.

In general, the duration of drying may range from about 6 hours to about 24 hours to ensure the mixture is homogeneous. In various embodiments, the duration of drying may range from about 6 hours to about 24 hours, from about 8 hours to about 20 hours, or from about 10 hours to about 14 hours.

After drying, the EVOH copolymer resin composition is in a solid form and pelletized. The EVOH copolymer resin composition can be finished in this step or further compounding to make the different kinds of EVOH copolymers combine together.

To compound, various compounders are known in the art. In one embodiment, the compounder is a Zenix ZPT-32HT twin screw extruder, which is commercially available from Zenix Industrial Co., LTD., with a screw having a length/diameter (L/D) of 10 mm/mm to 40 mm/mm, specifically, 10 mm/mm, 20 mm/mm, 30 mm/mm or 40 mm/mm, a rotation speed of 10 rpm, and a cylinder temperature profile as shown below to produce the final pellets of the EVOH copolymer resin composition. Besides, the length/diameter can be controlled by feeding entrance.

The EVOH copolymer resin composition may have a yield greater than 50%. In various embodiments, the ethylene-vinyl alcohol copolymer resin composition may have a yield greater than 50%, greater than 60%, greater than 70%, greater than 80%, greater than 90%, or greater than 99.5%.

In other embodiments, the EVOH copolymer resin composition may comprise a third EVOH copolymer. In this embodiment, the preparation of the third EVOH copolymer would be prepared as in steps (a)-(d) of the method detailed above. In step (i) above, a third EVOH copolymer would be introduced and compounded with the first and second EVOH copolymers as described in step (i).

(III) A Multi-Layer Structure

In yet another aspect, the present disclosure comprises a multi-layer structure. The multi-layer structure comprises (a) at least one layer formed from aforesaid EVOH copolymer resin composition; (b) at least one polymer layer formed from a polymer other than the EVOH copolymer composition; and (c) at least one adhesive layer. The multi-layer structure, as defined herein, provides improved oxygen-barrier properties, and improved mechanical properties.

(a) At Least One Layer Formed from Aforesaid EVOH Copolymer Resin Composition

The EVOH copolymer resin composition is described in more detail above in Section (I).

(b) At Least One Polymer Layer

The multi-layer structure comprises at least one polymer layer. Non-limiting examples of the polymer layer may be a low-density polyethylene layer, a polypropylene layer, or a nylon layer.

(c) At Least One Adhesive Layer

The multi-layer structure comprises at least one adhesive layer. The adhesive layer may be a tie layer. Non-limiting examples of common tie layer may be made from an ethylene-vinyl acetate resin, an ethylene-methyl acrylate resin, an ethylene-acrylic acid resin, or an ethylene-grafted maleic anhydride resin.

(d) Multi-Layer Structure

The multi-layer structures were prepared by co-extruding one layer formed from EVOH resin copolymer composition, two polymer layers, and two adhesive layers. The multi-layer films have 5 layers with the layer formed from EVOH copolymer resin composition sandwiched between two polymer layers. The adhesive layers were disposed between each side of the layer formed from EVOH copolymer resin composition and one of the polymer layers. Various multi-layer configurations can be prepared. In one embodiment, layer formed from EVOH copolymer resin composition (I), polymer layers (II), and adhesive layers (III) were fed into a five-layer co-extruder to produce a multi-layer sheet having a structure represented by: (II)/(III)/(I)/(III)/(II).

Each layer may have the same or different thickness (μm). Generally, the thickness of each layer in the multi-layer structure may range from about 20 μm to about 500 μm. In various embodiments, the thickness of each layer in the multi-layer structure may range from about 20 μm to about 500 μm, from about 25 μm to about 400 μm, or from about 50 μm to about 300 μm. In one embodiment, the layer formed from ethylene-vinyl alcohol copolymer resin composition may have a thickness of about 50 μm. In another embodiment, the polymer layer may have a thickness of about 300 μm. In still another embodiment, the adhesive layer may have a thickness of about 25 μm.

The multi-layer structure has an oxygen transmission rate of 2.00 $cm^3*20$ $μm/m^2*24$ $hr*atm$ or less, as measured by the method of ISO 14663-2 with a mocon OXTRAN 2/22 device at 65% relative humidity and 23° C., after thermoforming of the multilayer structure. In some instances, the multi-layer structure has an oxygen transmission rate of 1.90 $cm^3*20$ $μm/m^2*24$ $hr*atm$ or less, 1.80 $cm^3*20$ $μm/m^2*24$ $hr*atm$ or less, 1.70 $cm^3*20$ $μm/m^2*24$ $hr*atm$ or less, or 1.60 $cm^3*20$ $μm/m^2*24$ $hr*atm$ or less.

Each of these multi-layer structures provides improved oxygen-barrier properties and improved mechanical properties.

Definitions

When introducing elements of the embodiments described herein, the articles "a", "an", "the" and "said" are intended to mean that there are one or more of the elements. The terms "comprising", "including" and "having" are intended to be inclusive and mean that there may be additional elements other than the listed elements.

As various changes could be made in the above-described methods without departing from the scope of the invention, it is intended that all matter contained in the above description and in the examples given below, shall be interpreted as illustrative and not in a limiting sense.

EXAMPLES

Six non-limiting, exemplary ethylene-vinyl alcohol ("EVOH") copolymer resin compositions ("Example EVOHs 1-6") were produced according to aspects of the disclosure. Seven comparative ethylene-vinyl alcohol copolymer resin compositions ("Comparative EVOHs 1-7") were also prepared according to the methods discussed below.

Example 1: Preparation of EVOH 1

Example EVOH 1 was prepared from a first EVOH copolymer and a second EVOH copolymer. Specifically, the first EVOH copolymer was prepared according to the following steps:

Ethylene-Vinyl Acetate Copolymer Preparation Step:

A polymerization vessel equipped with a cooling coil was added 500 kg of vinyl acetate monomer, 100 kg of methanol, 70 ppm of diacetyl peroxide (catalyst) based on the weight of vinyl acetate monomer, and 0.015 kg of citric acid. After temporarily replacing the gaseous contents inside of the polymerization vessel with nitrogen, the nitrogen was replaced with ethylene and pressed until the ethylene pressure became 39 $kg/cm^2$. Under the ethylene pressure, the content in the polymerization vessel was brought to a temperature of 67° C. while being stirred to initiate polymerization. After 6 hours from the initiation of the polymerization where the degree of polymerization reached 60%, 0.0525 kg of sorbic acid (acting as a polymerization inhibitor) was added. An ethylene-vinyl acetate copolymer having an ethylene content of 32 mole % was obtained. The reaction liquid containing the ethylene-vinyl acetate copolymer was then supplied to a distillation tower, and methanol vapor was introduced into the lower part of the tower to remove unreacted vinyl acetate monomer to obtain a methanol solution of a first ethylene-vinyl acetate ("EVAc") copolymer.

Saponification Step:

Then, the first EVAc copolymer was saponified with sodium hydroxide to reach a saponification of 99.5% to obtain a first EVOH copolymer intermediate. The first EVOH copolymer intermediate was subsequently dissolved into a solution comprising methanol and water in a weight ratio of 60:40. After dissolving the first EVOH copolymer intermediate into the solution of methanol and water, the mixture had a 41 wt. % solid content of EVOH copolymer intermediate. The mixture of EVOH copolymer intermediate was maintained at a temperature of about 60° C. for one hour.

Pelletization Step:

The mixture of the EVOH copolymer intermediate, containing methanol and water, was then pelletized using underwater pelletization. Specifically, the mixture of methanol, water, and the EVOH copolymer intermediate was pumped into feeding tube with a flow rate of 120 L/min. The mixture was transferred to an inlet pipe, which had a diameter of 2.8 mm, cut by a rotating knife at a speed of 1,500 rpm, and then cooled by adding water having a temperature of 5° C. and subsequently centrifuged to produce pellets from the prepared EVOH copolymer intermediates.

First Solution Addition Step:

The EVOH copolymer intermediate pellets were washed with water and then immersed into a first solution comprising boron acid and sodium acetate. The first solution that the EVOH copolymer intermediate pellets were immersed in had a boron concentration of 600 ppm, and weight ratio of the first solution comprising boron acid and sodium acetate to the EVOH copolymer intermediate pellets was 1.2:1. Then, the final first EVOH copolymer was formed.

The second EVOH copolymer was prepared according to steps similar to those described above for first EVOH copolymer, except that: (1) in the EVAc copolymer preparation step, the ethylene content of the ethylene-vinyl acetate copolymer was 44 mole %, the ethylene pressure was 60 kg/cm$^2$ and the catalyst was 60 ppm; (2) in the second solution addition step, the boron concentration of the second solution was 400 ppm and the weight ratio of the second solution to the EVOH copolymer intermediate pellets was 1.5:1. The second EVOH copolymer was prepared separately from the first EVOH copolymer.

The separately prepared first EVOH copolymer and second EVOH copolymer were then combined by blending in water with weight ratio 1:1 of pellets to water for 10 minutes using a mixing speed of 20 rpm. The first EVOH copolymer and second EVOH copolymer were combined in a 75:25 weight ratio of the first EVOH copolymer to the second EVOH copolymer. After blending, the solution was removed and the pellets were dried under 100° C. for 24 hr. After drying, the pellets were compounded using a Zenix ZPT-32HT twin screw extruder, which was commercially available from Zenix Industrial Co., LTD., with a screw having a length/diameter (L/D) of 40 mm/mm, a rotation speed of 10 rpm, and a cylinder temperature profile as shown below to produce the final pellets of Example EVOH 1 with moisture content of 0.15 wt. %. The boron content and the alkali metal content of the final EVOH copolymer resin composition were listed in table 2.

Example 2: Preparation of EVOH 2

Example EVOH 2 was prepared from a first EVOH copolymer and a second EVOH copolymer. Specifically, the first EVOH copolymer was prepared according to the following steps:

Ethylene-Vinyl Acetate Copolymer Preparation Step:

A polymerization vessel equipped with a cooling coil was added 500 kg of vinyl acetate monomer, 100 kg of methanol, 50 ppm of diacetyl peroxide (catalyst) based on the weight of vinyl acetate monomer, and 0.015 kg of citric acid. After temporarily replacing the gaseous contents inside of the polymerization vessel with nitrogen, the nitrogen was replaced with ethylene and pressed until the ethylene pressure became 28 kg/cm$^2$. Under the ethylene pressure, the content in the polymerization vessel was brought to a temperature of 67° C. while being stirred to initiate polymerization. After 6 hours from the initiation of the polymerization where the degree of polymerization reached 60%, 0.0525 kg of sorbic acid (acting as a polymerization inhibitor) was added. An ethylene-vinyl acetate copolymer having an ethylene content of 24 mole % was obtained. The reaction liquid containing the ethylene-vinyl acetate copolymer was supplied to a distillation tower, and methanol vapor was introduced into the lower part of the tower to remove unreacted vinyl acetate monomer to obtain a methanol solution of a first EVAc copolymer.

Saponification Step:

The first EVAc copolymer was saponified with sodium hydroxide to reach a saponification of 99.5% to obtain a first EVOH copolymer intermediate. The first EVOH copolymer intermediate was subsequently dissolved into a solution comprising methanol and water in a weight ratio of 60:40. After dissolving the first EVOH copolymer intermediate into the solution of methanol and water, the mixture had a 41 wt. % solid content of EVOH copolymer intermediate. The mixture of EVOH copolymer intermediate was maintained at a temperature of about 60° C. for one hour.

Pelletization Step:

The mixture of the EVOH copolymer intermediate, containing methanol and water, was then pelletized using underwater pelletization. Specifically, the mixture of methanol, water, and the EVOH copolymer intermediate was pumped into feeding tube with a flow rate of 120 L/min. The mixture was transferred to an inlet pipe, which had a diameter of 2.8 mm, cut by a rotating knife at a speed of 1,500 rpm, and then cooled by adding water having a temperature of 5° C. and subsequently centrifuged to produce pellets from the prepared EVOH copolymer intermediates.

First Solution Addition Step:

The EVOH copolymer intermediate pellets were washed with water and then immersed into a first solution comprising sodium acetate. The first solution that the EVOH copolymer intermediate pellets were immersed in had a boron concentration of about 0 ppm and weight ratio of the first

| Twin extruder processing temperature(° C.) | | | | | | | | | | | | |
|---|---|---|---|---|---|---|---|---|---|---|---|---|
| 1 zone | 2 zone | 3 zone | 4 zone | 5 zone | 6 zone | 7 zone | 8 zone | 9 zone | 10 zone | 11 zone | 12 zone | 13 zone |
| 190 | 195 | 195 | 200 | 205 | 205 | 210 | 210 | 215 | 220 | 220 | 220 | 220 | solution comprising sodium acetate to the EVOH copolymer intermediate pellets was 1:1. Then, the final first EVOH copolymer was formed.

The second EVOH copolymer was prepared according to steps similar to those described above for the first EVOH copolymer, except that: (1) in the EVAc copolymer preparation step, the ethylene content of the ethylene-vinyl acetate copolymer was 48 mole %, the ethylene pressure was 70 kg/cm$^2$ and the catalyst was 70 ppm; (2) in the second solution adding step, the boron concentration of the second solution was 600 ppm and the weight ratio of the second solution comprising boron acid and sodium acetate to the EVOH copolymer intermediate pellets was 1.1:1. The second EVOH copolymer was prepared separately from the first EVOH copolymer.

The separately prepared first EVOH copolymer and second EVOH copolymer were then combined by blending in water with weight ratio 1:1 of pellets to water for 30 minutes using a mixing speed of 30 rpm. The first EVOH copolymer and second EVOH copolymer were combined in a 50:50 weight ratio of the first EVOH copolymer to the second EVOH copolymer. The mixture of the first EVOH copolymer and the second EVOH copolymer were dried to form the final pellets of Example EVOH 2 with moisture content of 0.15 wt. %. The boron content and the alkali metal content of the final EVOH copolymer resin composition were listed in table 2.

Example 3: Preparation of EVOH 3

Example EVOH 3 was prepared from a first EVOH copolymer and a second EVOH copolymer. Specifically, the first EVOH copolymer was prepared according to the following steps:

Ethylene-Vinyl Acetate Copolymer Preparation Step:

A polymerization vessel equipped with a cooling coil was added 500 kg of vinyl acetate monomer, 100 kg of methanol, 20 ppm of diacetyl peroxide (catalyst), based on the weight of vinyl acetate monomer, and 0.015 kg of citric acid. After temporarily replacing the gaseous contents inside of the polymerization vessel with nitrogen, the nitrogen was replaced with ethylene and pressed until the ethylene pressure became 50 kg/cm$^2$. Under the ethylene pressure, the content in the polymerization vessel was brought to a temperature of 67° C. while being stirred to initiate polymerization. After 6 hours from the initiation of the polymerization where the degree of polymerization reached 60%, 0.0525 kg of sorbic acid (acting as a polymerization inhibitor) was added. An ethylene-vinyl acetate copolymer having an ethylene content of 38 mole % was obtained. The reaction liquid containing the ethylene-vinyl acetate copolymer was supplied to a distillation tower, and methanol vapor was introduced into the lower part of the tower to remove unreacted vinyl acetate monomer to obtain a methanol solution of a first EVAc copolymer.

Saponification Step:

The first EVAc copolymer was saponified with sodium hydroxide to reach a saponification of 99.5% to obtain a first EVOH copolymer intermediate. The first EVOH copolymer intermediate was then subsequently dissolved into a solution comprising methanol and water in a weight ratio of 60:40. After dissolving the first EVOH copolymer intermediate into the solution of methanol and water, the mixture had a 41 wt. % solid content of EVOH copolymer intermediate. The mixture of EVOH copolymer intermediate was maintained at a temperature of about 60° C. for one hour.

Pelletization Step:

The mixture of the EVOH copolymer intermediate, containing methanol and water, was then pelletized using underwater pelletization. Specifically, the mixture of methanol, water, and the EVOH copolymer intermediate was pumped into feeding tube with a flow rate of 120 L/min. The mixture was transferred to an inlet pipe, which had a diameter of 2.8 mm, cut by a rotating knife at a speed of 1,500 rpm, and then cooled by adding water having a temperature of 5° C. and subsequently centrifuged to produce pellets from the prepared EVOH copolymer intermediates.

First Solution Addition Step:

The EVOH copolymer intermediate pellets were washed with water and then immersed into a first solution comprising boron acid and sodium acetate. The first solution that the EVOH copolymer intermediate pellets were immersed in had a boron concentration of 330 ppm and weight ratio of the first solution comprising boron acid and sodium acetate to the EVOH copolymer intermediate pellets was 1:1. Then, the final first EVOH copolymer was formed.

The second EVOH copolymer was prepared according to steps similar to those described above for the first EVOH copolymer, except that: (1) in the EVAc copolymer preparation step, the ethylene content of the ethylene-vinyl acetate copolymer was 48 mole %, the ethylene pressure was 70 kg/cm$^2$ and the catalyst was 10 ppm; (2) in the second solution adding step, the boron concentration of the second solution was 150 ppm and the weight ratio of the second solution comprising boron acid and sodium acetate to the EVOH copolymer intermediate pellets was 1.8:1. The second EVOH copolymer was prepared separately from the first EVOH copolymer.

The separately prepared first EVOH copolymer and second EVOH copolymer were then combined by blending in water with weight ratio 1:1 of pellets to water for 15 minutes using a mixing speed of 50 rpm. The first EVOH copolymer and second EVOH copolymer were combined in a 60:40 weight ratio of the first EVOH copolymer to the second EVOH copolymer. After blending, the solution was removed and the pellets were dried under 100° C. for 24 hrs. After drying, the pellets were compounded using a Zenix ZPT-32HT twin screw extruded, which was commercially available from Zenix Industrial Co., LTD., with a screw having a length/diameter (L/D) of 30 mm/mm, a rotation speed of 10 rpm, and a cylinder temperature profile as shown below to produce the final pellets of Example EVOH 3 with moisture content of 0.15 wt. %. The boron content and the alkali metal content of the final EVOH copolymer resin composition were listed in table 2.

| Twin extruder processing temperature(° C.) | | | | | | | | | | | | |
|---|---|---|---|---|---|---|---|---|---|---|---|---|
| 1 zone | 2 zone | 3 zone | 4 zone | 5 zone | 6 zone | 7 zone | 8 zone | 9 zone | 10 zone | 11 zone | 12 zone | 13 zone |
| 190 | 195 | 195 | 200 | 205 | 205 | 210 | 210 | 215 | 220 | 220 | 220 | 220 |

Example 4: Preparation of EVOH 4

Example EVOH 4 was prepared from a first EVOH copolymer and a second EVOH copolymer. Specifically, the first EVOH copolymer was prepared according to the following steps:

Ethylene-Vinyl Acetate Copolymer Preparation Step:

A polymerization vessel equipped with a cooling coil was added 500 kg of vinyl acetate monomer, 100 kg of methanol, 40 ppm of diacetyl peroxide (catalyst) based on the weight of vinyl acetate monomer, and 0.015 kg of citric acid. After temporarily replacing the gaseous contents inside of the polymerization vessel with nitrogen, the nitrogen was replaced with ethylene and pressed until the ethylene pressure became 35 kg/cm$^2$. Under the ethylene pressure, the content in the polymerization vessel was brought to a temperature of 67° C. while being stirred to initiate polymerization. After 6 hours from the initiation of the polymerization where the degree of polymerization reached 60%, 0.0525 kg of sorbic acid (acting as a polymerization inhibitor) was added. An ethylene-vinyl acetate copolymer having an ethylene content of 29 mole % was obtained. The reaction liquid containing the ethylene-vinyl acetate copolymer was supplied to a distillation tower, and methanol vapor was introduced into the lower part of the tower to remove unreacted vinyl acetate monomer to obtain a methanol solution of a first EVAc copolymer.

Saponification Step:

Then, the first EVAc copolymer was saponified with sodium hydroxide to reach a saponification of 99.5% to obtain a first EVOH copolymer intermediate. The first EVOH copolymer intermediate was subsequently dissolved into a solution comprising methanol and water in a weight ratio of 60:40. After dissolving the first EVOH copolymer intermediate into the solution of methanol and water, the mixture had a 41 wt. % solid content of EVOH copolymer intermediate. The mixture of EVOH copolymer intermediate was maintained at a temperature of about 60° C. for one hour.

Pelletization Step:

The mixture of the EVOH copolymer intermediate, containing methanol and water, was then pelletized using underwater pelletization. Specifically, the mixture of methanol, water, and the EVOH copolymer intermediate was pumped into feeding tube with a flow rate of 120 L/min. The mixture was transferred to an inlet pipe, which had a diameter of 2.8 mm, cut by a rotating knife at a speed of 1,500 rpm, and then cooled by adding water having a temperature of 5° C. and subsequently centrifuged to produce pellets from the prepared EVOH copolymer intermediates.

First Solution Addition Step:

The EVOH copolymer intermediate pellets were washed with water and then immersed into a first solution comprising boron acid and sodium acetate. The first solution that the EVOH copolymer intermediate pellets were immersed in had a boron concentration of 500 ppm and weight ratio of the first solution comprising boron acid and sodium acetate to the EVOH copolymer intermediate pellets was 0.8:1. Then, the final first EVOH copolymer was formed.

The second EVOH copolymer was prepared according to steps similar to those described above for first EVOH copolymer, except that: (1) in the EVAc copolymer preparation step, the ethylene content of the ethylene-vinyl acetate copolymer was 38 mole %, the ethylene pressure was 50 kg/cm$^2$ and the catalyst was 50 ppm; (2) in the second solution adding step, the boron concentration of the second solution was 50 ppm and the weight ratio of the second solution comprising boron acid and sodium acetate to the EVOH copolymer intermediate pellets was 1.1:1. The second EVOH copolymer was prepared separately from the first EVOH copolymer.

The separately prepared first EVOH copolymer and second EVOH copolymer were then combined by blending in water with weight ratio 1:1 of pellets to water for 60 minutes using a mixing speed of 40 rpm. The first EVOH copolymer and second EVOH copolymer were combined in a 90:10 weight ratio of the first EVOH copolymer to the second EVOH copolymer. The mixture of the first EVOH copolymer and the second EVOH copolymer were dried again to form the final pellets of Example EVOH 4 with moisture content of 0.15 wt. %. The boron content and the alkali metal content of the final EVOH copolymer resin composition were listed in table 2.

Example 5: Preparation of EVOH 5

Example EVOH 5 was prepared from a first EVOH copolymer and a second EVOH copolymer. Specifically, the first EVOH copolymer was prepared according to the following steps:

Ethylene-Vinyl Acetate Copolymer Preparation Step:

A polymerization vessel equipped with a cooling coil was added 500 kg of vinyl acetate monomer, 100 kg of methanol, 50 ppm of diacetyl peroxide (catalyst), based on the weight of vinyl acetate monomer, and 0.015 kg of citric acid. After temporarily replacing the gaseous contents inside of the polymerization vessel with nitrogen, the nitrogen was replaced with ethylene and pressed until the ethylene pressure became 60 kg/cm$^2$. Under ethylene pressure, the content in the polymerization vessel was brought to a temperature of 67° C. while being stirred to initiate polymerization. After 6 hours from the initiation of the polymerization where the degree of polymerization reached 60%, 0.0525 kg of sorbic acid (acting as a polymerization inhibitor) was added. An ethylene-vinyl acetate copolymer having an ethylene content of 44 mole % was obtained. The reaction liquid containing the ethylene-vinyl acetate copolymer was supplied to a distillation tower, and methanol vapor was introduced into the lower part of the tower to remove unreacted vinyl acetate monomer to obtain a methanol solution of a first EVAc copolymer.

Saponification Step:

The first EVAc copolymer was saponified with sodium hydroxide to reach a saponification of 99.5% to obtain a first EVOH copolymer intermediate. The first EVOH copolymer intermediate was then subsequently dissolved into a solution comprising methanol and water in a weight ratio of 60:40. After dissolving the first EVOH copolymer intermediate into the solution of methanol and water, the mixture had a 41 wt. % solid content of EVOH copolymer intermediate. The mixture of EVOH copolymer intermediate was maintained at a temperature of about 60° C. for one hour.

Pelletization Step:

The mixture of the EVOH copolymer intermediate, containing methanol and water, was then pelletized using underwater pelletization. Specifically, the mixture of methanol, water, and the EVOH copolymer intermediate was pumped into feeding tube with a flow rate of 120 L/min. The mixture was transferred to an inlet pipe, which had a diameter of 2.8 mm, cut by a rotating knife at a speed of 1,500 rpm, and then cooled by adding water having a temperature of 5° C. and subsequently centrifuged to produce pellets from the prepared EVOH copolymer intermediates.

First Solution Addition Step:

The EVOH copolymer intermediate pellets were washed with water and then immersed into a first solution comprising boron acid and sodium acetate. The first solution that the EVOH copolymer intermediate pellets were immersed in had a boron concentration of 500 ppm and weight ratio of the first solution comprising boron acid and sodium acetate to the EVOH copolymer intermediate pellets was 1.1:1. Then, the final first EVOH copolymer was formed.

The second EVOH copolymer was prepared according to steps similar to those described above for the first EVOH copolymer, except that: (1) in the EVAc copolymer preparation step, the ethylene content of the ethylene-vinyl acetate copolymer was 44 mole %, the ethylene pressure was 60 $kg/cm^2$ and the catalyst was 100 ppm; (2) in the second solution adding step, the boron concentration of the second solution was 200 ppm and the weight ratio of the second solution comprising boron acid and sodium acetate to the EVOH copolymer intermediate pellets was 1.3:1. The second EVOH copolymer was prepared separately from the first EVOH copolymer.

The separately prepared first EVOH copolymer and second EVOH copolymer were then combined by blending in water with weight ratio 1:1 of pellets to water for 30 minutes using a mixing speed of 60 rpm. The first EVOH copolymer and second EVOH copolymer were combined in an 80:20 weight ratio of the first EVOH copolymer to the second EVOH copolymer. The mixture of the first EVOH copolymer and the second EVOH copolymer were dried to form the final pellets of Example EVOH 5 with moisture content of 0.15 wt. %. The boron content and the alkali metal content of the final EVOH copolymer resin composition were listed in table 2.

Example 6: Preparation of EVOH 6

Example EVOH 6 was prepared from three EVOH copolymers. The first EVOH copolymer was prepared according to the following steps:

Ethylene-Vinyl Acetate Copolymer Preparation Step:

A polymerization vessel equipped with a cooling coil was added 500 kg of vinyl acetate monomer, 100 kg of methanol, 10 ppm of diacetyl peroxide (catalyst), based on the weight of vinyl acetate monomer, and 0.015 kg of citric acid. After temporarily replacing the gaseous contents inside of the polymerization vessel with nitrogen, the nitrogen was replaced with ethylene and pressed until the ethylene pressure became 28 $kg/cm^2$. Under the ethylene pressure, the content in the polymerization vessel was brought to a temperature of 67° C. while being stirred to initiate polymerization. After 6 hours from the initiation of the polymerization where the degree of polymerization reached 60%, 0.0525 kg of sorbic acid (acting as a polymerization inhibitor) was added. An ethylene-vinyl acetate copolymer having an ethylene content of 24 mole % was obtained. Then, the reaction liquid containing the ethylene-vinyl acetate copolymer was supplied to a distillation tower, and methanol vapor was introduced into the lower part of the tower to remove unreacted vinyl acetate monomer to obtain a methanol solution of a first EVAc copolymer.

Saponification Step:

The first EVAc copolymer was saponified with sodium hydroxide to reach a saponification of 99.5% to obtain a first EVOH copolymer intermediate. The first EVOH copolymer intermediate was then subsequently dissolved into a solution comprising methanol and water in a weight ratio of 60:40. After dissolving the first EVOH copolymer intermediate into the solution of methanol and water, the mixture had a 41 wt. % solid content of EVOH copolymer intermediate. The mixture of EVOH copolymer intermediate was maintained at a temperature of about 60° C. for one hour.

Pelletization Step:

The mixture of the EVOH copolymer intermediate, containing methanol and water, was then pelletized using underwater pelletization. Specifically, the mixture of methanol, water, and the EVOH copolymer intermediate was pumped into feeding tube with a flow rate of 120 L/min. The mixture was transferred to an inlet pipe, which had a diameter of 2.8 mm, cut by a rotating knife at a speed of 1,500 rpm, and then cooled by adding water having a temperature of 5° C. and subsequently centrifuged to produce pellets from the prepared EVOH copolymer intermediates.

First Solution Addition Step:

The EVOH copolymer intermediate pellets were washed with water and then immersed into a first solution comprising boron acid and sodium acetate. The first solution that the EVOH copolymer intermediate pellets were immersed in had a boron concentration of 300 ppm and weight ratio of the first solution comprising boron acid and sodium acetate to the EVOH copolymer intermediate pellets was 1.3:1. Then, the final first EVOH copolymer was formed.

The second EVOH copolymer was prepared according to steps similar to those described above for the first EVOH copolymer, except that: (1) in the EVAc copolymer preparation step, the ethylene content of the ethylene-vinyl acetate copolymer was 32 mole %, the ethylene pressure was 39 $kg/cm^2$ and the catalyst was 30 ppm; (2) in the second solution adding step, the boron concentration was 400 ppm and the weight ratio of the second solution comprising boron acid and sodium acetate to the EVOH copolymer intermediate pellets was 1.2:1. The second EVOH copolymer was prepared separately from the first EVOH copolymer.

The third EVOH copolymer was prepared according to steps similar to those described above for the first EVOH copolymer, except that: (1) in the EVAc copolymer preparation step, the ethylene content of the ethylene-vinyl acetate copolymer was 48 mole %, the ethylene pressure was 70 $kg/cm^2$ and the catalyst was 50 ppm; (2) in the third solution adding step, the boron concentration of the third solution was 200 ppm and the weight ratio of the third solution comprising boron acid and sodium acetate to the EVOH copolymer intermediate pellets was 1.5:1. The third EVOH copolymer was prepared separately from the first and second EVOH copolymers.

The separately prepared first, second and third EVOH copolymers were then combined by blending in water with weight ratio 1:1 of pellets to water for 20 minutes using a mixing speed of 40 rpm. The first, second and third EVOH copolymers were combined in a 60:40:10 weight ratio. After blending, the solution was removed and the pellets were dried under 100° C. for 24 hrs. After drying, the pellets were compounded using a Zenix ZPT-32HT twin screw extruder, which was commercially available from Zenix Industrial Co., LTD., with a screw having a length/diameter (L/D) of 30 mm/mm, a rotation speed of 10 rpm, and a cylinder temperature profile as shown below to produce the final pellets of Example EVOH 6 with moisture content of 0.15 wt. %. The boron content and the alkali metal content of the final EVOH copolymer resin composition were listed in table 2.

| Twin extruder processing temperature(° C.) | | | | | | | | | | | | |
|---|---|---|---|---|---|---|---|---|---|---|---|---|
| 1 zone | 2 zone | 3 zone | 4 zone | 5 zone | 6 zone | 7 zone | 8 zone | 9 zone | 10 zone | 11 zone | 12 zone | 13 zone |
| 190 | 195 | 195 | 200 | 205 | 205 | 210 | 210 | 215 | 220 | 220 | 220 | 220 |

Example 7: Preparation of Comparative EVOH 1

Comparative EVOH 1 was prepared from a first EVOH copolymer and a second EVOH copolymer. The first EVOH copolymer was prepared according to the following steps:

Ethylene-Vinyl Acetate Copolymer Preparation Step:

A polymerization vessel equipped with a cooling coil was added 500 kg of vinyl acetate monomer, 100 kg of methanol, 10 ppm of diacetyl peroxide (catalyst), based on the weight of vinyl acetate monomer, and 0.015 kg of citric acid. After temporarily replacing the gaseous contents inside of the polymerization vessel with nitrogen, the nitrogen was replaced with ethylene and pressed until the ethylene pressure became 35 kg/cm$^2$. Under the ethylene pressure, the content in the polymerization vessel was brought to a temperature of 67° C. while being stirred to initiate polymerization. After 6 hours from the initiation of the polymerization where the degree of polymerization reached 60%, 0.0525 kg of sorbic acid (acting as a polymerization inhibitor) was added. An ethylene-vinyl acetate copolymer having an ethylene content of 29 mole % was obtained. The reaction liquid containing the ethylene-vinyl acetate copolymer was supplied to a distillation tower, and methanol vapor was introduced into the lower part of the tower to remove unreacted vinyl acetate monomer to obtain a methanol solution of a first EVAc copolymer.

Saponification Step:

Then, the first EVAc copolymer was saponified with sodium hydroxide to reach a saponification of 99.5% to obtain a first EVOH intermediate. The first EVOH copolymer intermediate was then subsequently dissolved into a solution comprising methanol and water in a weight ratio of 60:40. After dissolving the first EVOH copolymer intermediate into the solution of methanol and water, the mixture had a 41 wt. % solid content of EVOH copolymer intermediate. The mixture of EVOH copolymer intermediate was maintained at a temperature of about 60° C. for one hour.

Pelletization Step:

The mixture of the EVOH copolymer intermediate, containing methanol and water, was then pelletized using underwater pelletization. Specifically, the mixture of methanol, water, and the EVOH copolymer intermediate was pumped into feeding tube with a flow rate of 120 L/min. The mixture was transferred to an inlet pipe, which had a diameter of 2.8 mm, cut by a rotating knife at a speed of 1,500 rpm, and then cooled by adding water having a temperature of 5° C. and subsequently centrifuged to produce pellets from the prepared EVOH copolymer intermediates.

First Solution Addition Step:

The EVOH copolymer intermediate pellets were washed with water and then immersed into a first solution comprising boron acid and sodium acetate. The first solution that the EVOH copolymer intermediate pellets were immersed in had a boron concentration of 400 ppm and weight ratio of the first solution comprising boron acid and sodium acetate to the EVOH copolymer intermediate pellets was 1.5:1. Then, the final first EVOH copolymer was formed.

The second EVOH copolymer was prepared according to steps similar to those described above for the first EVOH copolymer, except that: (1) in the EVAc copolymer preparation step, the ethylene content of the ethylene-vinyl acetate copolymer was 44 mole %, the ethylene pressure was 60 kg/cm$^2$ and the catalyst was 100 ppm; (2) in the second solution adding step, the boron concentration of the second solution was 300 ppm and the weight ratio of the second solution comprising boron acid and sodium acetate to the EVOH copolymer intermediate pellets was 1.2:1. The second EVOH copolymer was prepared separately from the first EVOH copolymer.

The separately prepared first EVOH copolymer and second EVOH copolymer were then combined by dry blending and compounding. Specifically, the respective EVOH copolymer was dry blended in a 70:30 weight ratio of the first EVOH copolymer to the second EVOH copolymer using a conical screw mixer for 5 minutes at a mixing speed of 10 rpm. The dry blended mixture of EVOH copolymers was then compounded using a Zenix ZPT-32HT twin screw extruder, which was commercially available from Zenix Industrial Co., LTD., with a screw having a length/diameter (L/D) of 10 mm/mm, a rotation speed of 10 rpm, and a cylinder temperature profile as shown below to produce the final pellets of Comparative EVOH 1 with moisture content of 0.15 wt. %. The boron content and the alkali metal content of the final EVOH copolymer resin composition were listed in table 2.

| Twin extruder processing temperature(° C.) | | | | | | | | | | | | |
|---|---|---|---|---|---|---|---|---|---|---|---|---|
| 1 zone | 2 zone | 3 zone | 4 zone | 5 zone | 6 zone | 7 zone | 8 zone | 9 zone | 10 zone | 11 zone | 12 zone | 13 zone |
| 190 | 195 | 195 | 200 | 205 | 205 | 210 | 210 | 215 | 220 | 220 | 220 | 220 |

Example 8: Preparation of Comparative EVOH 2

Comparative EVOH 2 was prepared from a first EVOH copolymer and a second EVOH copolymer. The first EVOH copolymer was prepared according to the following steps:

Ethylene-Vinyl Acetate Copolymer Preparation Step:

A polymerization vessel equipped with a cooling coil was added 500 kg of vinyl acetate monomer, 100 kg of methanol, 70 ppm of diacetyl peroxide (catalyst), based on the weight of vinyl acetate monomer, and 0.015 kg of citric acid. After temporarily replacing the gaseous contents inside of the polymerization vessel with nitrogen, the nitrogen was replaced with ethylene and pressed until the ethylene pressure became 39 kg/cm$^2$. Under the ethylene pressure, the content in the polymerization vessel was brought to a temperature of 67° C. while being stirred to initiate polymerization. After 6 hours from the initiation of the polymerization where the polymerization rate reached 60%, 0.0525 kg of sorbic acid (acting as a polymerization inhibitor) was added. An ethylene-vinyl acetate copolymer having an ethylene content of 32 mole % was obtained. The reaction liquid containing the ethylene-vinyl acetate copolymer was supplied to a distillation tower, and methanol vapor was introduced into the lower part of the tower to remove unreacted vinyl acetate monomer to obtain a methanol solution of a first EVAc copolymer.

Saponification Step:

The first EVAc copolymer was saponified with sodium hydroxide to reach a saponification of 99.5% to obtain a first EVOH copolymer intermediate. The first EVOH copolymer intermediate was then subsequently dissolved into a solution comprising methanol and water in a weight ratio of 60:40. After dissolving the first EVOH copolymer intermediate into the solution of methanol and water, the mixture had a 41 wt. % solid content of EVOH copolymer intermediate. The mixture of EVOH copolymer intermediate was maintained at a temperature of about 60° C. for one hour.

Pelletization Step:

The mixture of the EVOH copolymer intermediate, containing methanol and water, was then pelletized using underwater pelletization. Specifically, the mixture of methanol, water, and the EVOH copolymer intermediate was pumped into feeding tube with a flow rate of 120 L/min. The mixture was transferred to an inlet pipe, which had a diameter of 2.8 mm, cut by a rotating knife at a speed of 1,500 rpm, and then cooled by adding water having a temperature of 5° C. and subsequently centrifuged to produce pellets from the prepared EVOH copolymer intermediates.

First Solution Addition Step:

The EVOH copolymer intermediate pellets were washed with water and then immersed into a first solution comprising sodium acetate. The first solution that the EVOH copolymer intermediate pellets were immersed in had a boron concentration of about 0 ppm and weight ratio of the first solution comprising sodium acetate to the EVOH copolymer intermediate pellets was 1.1:1. Then, the final first EVOH copolymer was formed.

The second EVOH copolymer was prepared according to steps similar to those described above for the first EVOH copolymer, except that: (1) in the EVAc copolymer preparation step, the ethylene content of the ethylene-vinyl acetate copolymer was 38 mole %, the ethylene pressure was 50 kg/cm$^2$ and the catalyst was 10 ppm; (2) in the second solution adding step, the boron concentration of the second solution was 300 ppm and the weight ratio of the second solution comprising boron acid and sodium acetate to the EVOH copolymer intermediate pellets was 1.3:1. The second EVOH copolymer was prepared separately from the first EVOH copolymer.

The separately prepared first EVOH copolymer and second EVOH copolymer were then combined by blending in water with weight ratio 1:1 of pellets to water for 10 minutes using a mixing speed of 10 rpm. The first EVOH copolymer and second EVOH copolymer were combined in an 80:20 weight ratio of the first EVOH copolymer to the second EVOH copolymer. The mixture of the first EVOH copolymer and the second EVOH copolymer were dried to form the final pellets of Comparative EVOH 2 with moisture content of 0.15 wt. %. The boron content and the alkali metal content of the final EVOH copolymer resin composition were listed in table 2.

Example 9: Preparation of Comparative EVOH 3

Comparative EVOH 3 was prepared from a first EVOH copolymer and a second EVOH copolymer. The first EVOH copolymer was prepared according to the following steps:

Ethylene-Vinyl Acetate Copolymer Preparation Step:

A polymerization vessel equipped with a cooling coil was added 500 kg of vinyl acetate monomer, 100 kg of methanol, 10 ppm of diacetyl peroxide (catalyst), based on the weight of vinyl acetate monomer, and 0.015 kg of citric acid. After temporarily replacing the gaseous contents inside of the polymerization vessel with nitrogen, the nitrogen was replaced with ethylene and pressed until the ethylene pressure became 35 kg/cm$^2$. Under the ethylene pressure, the content in the polymerization vessel was brought to a temperature of 67° C. while being stirred to initiate polymerization. After 6 hours from the initiation of the polymerization where the degree of polymerization reached 60%, 0.0525 kg of sorbic acid (acting as a polymerization inhibitor) was added. An ethylene-vinyl acetate copolymer having an ethylene content of 29 mole % was obtained. The reaction liquid containing the ethylene-vinyl acetate copolymer was supplied to a distillation tower, and methanol vapor was introduced into the lower part of the tower to remove unreacted vinyl acetate monomer to obtain a methanol solution of a first EVAc copolymer.

Saponification Step:

Then, the first EVAc copolymer was saponified with sodium hydroxide to reach a saponification of 99.5% to obtain a first EVOH copolymer intermediate. The first EVOH copolymer intermediate was then subsequently dissolved into a solution comprising methanol and water in a weight ratio of 60:40. After dissolving the first EVOH copolymer intermediate into the solution of methanol and water, the mixture had a 41 wt. % solid content of EVOH copolymer intermediate. The mixture of EVOH copolymer intermediate was maintained at a temperature of about 60° C. for one hour.

Pelletization Step:

The mixture of the EVOH copolymer intermediate, containing methanol and water, was then pelletized using underwater pelletization. Specifically, the mixture of methanol, water, and the EVOH copolymer intermediate was pumped into feeding tube with a flow rate of 120 L/min. The mixture was transferred to an inlet pipe, which had a diameter of 2.8 mm, cut by a rotating knife at a speed of 1,500 rpm, and then cooled by adding water having a temperature of 5° C. and subsequently centrifuged to produce pellets from the prepared EVOH copolymer intermediates.

First Solution Addition Step:

The EVOH copolymer intermediate pellets were washed with water and then immersed into a first solution comprising sodium acetate. The first solution that the EVOH copolymer intermediate pellets were immersed in had a boron concentration of about 0 ppm and weight ratio of the first solution comprising boron acid and sodium acetate to the EVOH copolymer intermediate pellets was 1.1:1. Then, the final first EVOH copolymer was formed.

The second EVOH copolymer was prepared according to steps similar to those described above for the first EVOH copolymer, except that: (1) in the EVAc copolymer preparation step, the ethylene content of the ethylene-vinyl acetate copolymer was 48 mole %, the ethylene pressure was 70 kg/cm² and the catalyst was 70 ppm; (2) in the second solution adding step, the boron concentration of the second solution was 1000 ppm and the weight ratio of the second solution comprising boron acid and sodium acetate to the EVOH copolymer intermediate pellets was 2:1. The second EVOH copolymer was prepared separately from the first EVOH copolymer.

The separately prepared first EVOH copolymer and second EVOH copolymer were then combined by blending in water with weight ratio 1:1 of pellets to water for 60 minutes using a mixing speed of 30 rpm. The first EVOH copolymer and second EVOH copolymer were combined in an 80:20 weight ratio of the first EVOH copolymer to the second EVOH copolymer. The mixture of the first EVOH copolymer and the second EVOH copolymer were dried to form the final pellets of Comparative EVOH 3 with moisture content of 0.15 wt. %. The boron content and the alkali metal content of the final EVOH copolymer resin composition were listed in table 2.

Example 10: Preparation of Comparative EVOH 4

Comparative EVOH 4 was prepared from a first EVOH copolymer and a second EVOH copolymer. The first EVOH copolymer was prepared according to the following steps:

Ethylene-Vinyl Acetate Copolymer Preparation Step:

A polymerization vessel equipped with a cooling coil was added 500 kg of vinyl acetate monomer, 100 kg of methanol, 35 ppm of diacetyl peroxide (catalyst), based on the weight of vinyl acetate monomer, and 0.015 kg of citric acid. After temporarily replacing the gaseous contents inside of the polymerization vessel with nitrogen, the nitrogen was replaced with ethylene and pressed until the ethylene pressure became 35 kg/cm². Under the ethylene pressure, the content in the polymerization vessel was brought to a temperature of 67° C. while being stirred to initiate polymerization. After 6 hours from the initiation of the polymerization where the polymerization rate reached 60%, 0.0525 kg of sorbic acid (acting as a polymerization inhibitor) was added. An ethylene-vinyl acetate copolymer having an ethylene content of 29 mole % was obtained. Then, the reaction liquid containing the ethylene-vinyl acetate copolymer was supplied to a distillation tower, and methanol vapor was introduced into the lower part of the tower to remove unreacted vinyl acetate monomer to obtain a methanol solution of a first EVAc copolymer.

Saponification Step:

The first EVAc copolymer was saponified with sodium hydroxide to reach a saponification of 99.5% to obtain a first EVOH copolymer intermediate. The first EVOH copolymer intermediate was then subsequently dissolved into a solution comprising methanol and water in a weight ratio of 60:40. After dissolving the first EVOH copolymer intermediate into the solution of methanol and water, the solution had a 41 wt. % solid content of EVOH. The mixture of EVOH copolymer intermediate was maintained at a temperature of about 60° C. for one hour.

Pelletization Step:

The mixture of the EVOH copolymer intermediate, containing methanol and water, was then pelletized using underwater pelletization. Specifically, the mixture of methanol, water, and the EVOH copolymer intermediate was pumped into feeding tube with a flow rate of 120 L/min. The mixture was transferred to an inlet pipe, which had a diameter of 2.8 mm, cut by a rotating knife at a speed of 1,500 rpm, and then cooled by adding water having a temperature of 5° C. and subsequently centrifuged to produce pellets from the prepared EVOH copolymer intermediates.

First Solution Addition Step:

The EVOH copolymer intermediate pellets were washed with water and then immersed into a first solution comprising boron acid and sodium acetate with the concentration. The first solution that the EVOH copolymer intermediate pellets were immersed in had a boron concentration of 600 ppm and weight ratio of the first solution comprising boron acid and sodium acetate to the EVOH copolymer intermediate pellets was 1.3:1. Then, the final first EVOH copolymer was formed.

The second EVOH copolymer was prepared according to steps similar to those described above for the first EVOH copolymer, except that: (1) in the EVAc copolymer preparation step, the ethylene content of the ethylene-vinyl acetate copolymer was 60 mole %, the ethylene pressure was 85 kg/cm² and the catalyst was 60 ppm; (2) in the second solution adding step, the boron concentration of the second solution was 400 ppm and the weight ratio of the second solution comprising boron acid and sodium acetate to the EVOH copolymer intermediate pellets was 1.3:1. The second EVOH copolymer was prepared separately from the first EVOH copolymer.

The separately prepared first EVOH copolymer and second EVOH copolymer were then combined by compounding. Specifically, the EVOH pellets were compounded in a 95:5 weight ratio of the first EVOH copolymer to the second EVOH copolymer using a Zenix ZPT-32HT twin screw extruder, which was commercially available from Zenix Industrial Co., LTD., with a screw having a length/diameter (L/D) of 10 mm/mm, a rotation speed of 10 rpm, and a cylinder temperature profile as shown below to produce the final pellets of Comparative EVOH 4 with moisture content of 0.15 wt. %. The boron content and the alkali metal content of the final EVOH copolymer resin composition were listed in table 2.

| Twin extruder processing temperature(° C.) | | | | | | | | | | | | |
|---|---|---|---|---|---|---|---|---|---|---|---|---|
| 1 zone | 2 zone | 3 zone | 4 zone | 5 zone | 6 zone | 7 zone | 8 zone | 9 zone | 10 zone | 11 zone | 12 zone | 13 zone |
| 190 | 195 | 195 | 200 | 205 | 205 | 210 | 210 | 215 | 220 | 220 | 220 | 220 |

Example 11: Preparation of Comparative EVOH 5

Comparative EVOH 5 was prepared from a first EVOH copolymer and a second EVOH copolymer. The first EVOH copolymer was prepared according to the following steps:

Ethylene-Vinyl Acetate Copolymer Preparation Step:

A polymerization vessel equipped with a cooling coil was added 500 kg of vinyl acetate monomer, 100 kg of methanol, 70 ppm of diacetyl peroxide (catalyst), based on the weight of vinyl acetate monomer, and 0.015 kg of citric acid. After temporarily replacing the gaseous contents inside of the polymerization vessel with nitrogen, the nitrogen was replaced with ethylene and pressed until the ethylene pressure became 35 kg/cm². Under the ethylene pressure, the content in the polymerization vessel was brought to a temperature of 67° C. while being stirred to initiate polymerization. After 6 hours from the initiation of the polymerization where the degree of polymerization reached 60%, 0.0525 kg of sorbic acid (acting as a polymerization inhibitor) was added. An ethylene-vinyl acetate copolymer having an ethylene content of 29 mole % was obtained. Then, the reaction liquid containing the ethylene-vinyl acetate copolymer was supplied to a distillation tower, and methanol vapor was introduced into the lower part of the tower to remove unreacted vinyl acetate monomer to obtain a methanol solution of a first EVAc copolymer.

Saponification Step:

Then, the first EVAc was saponified with sodium hydroxide to reach a saponification of 99.5% to obtain a first EVOH copolymer intermediate. The first EVOH copolymer intermediate was then subsequently dissolved into a solution comprising methanol and water in a weight ratio of 60:40. After dissolving the first EVOH copolymer intermediate into the solution of methanol and water, the mixture had a 41 wt. % solid content of EVOH copolymer intermediate. The mixture of EVOH copolymer intermediate was maintained at a temperature of about 60° C. for one hour.

Pelletization Step:

The mixture of the EVOH copolymer intermediate, containing methanol and water, was then pelletized using underwater pelletization. Specifically, the mixture of methanol, water, and the EVOH copolymer intermediate was pumped into feeding tube with a flow rate of 120 L/min. The mixture was transferred to an inlet pipe, which had a diameter of 2.8 mm, cut by a rotating knife at a speed of 1,500 rpm, and then cooled by adding water having a temperature of 5° C. and subsequently centrifuged to produce pellets from the prepared EVOH copolymer intermediates.

First Solution Addition Step:

The EVOH copolymer intermediate pellets were washed with water and then immersed into a first solution comprising boron acid and sodium acetate. The first solution that the EVOH copolymer intermediate pellets were immersed in had a boron concentration of 200 ppm and weight ratio of the first solution comprising boron acid and sodium acetate to the EVOH copolymer intermediate pellets was 1.1:1. Then, the final first EVOH copolymer was formed.

The second EVOH copolymer was prepared according to steps similar to those described above for the first EVOH copolymer, except that: (1) in the EVAc copolymer preparation step, the ethylene content of the ethylene-vinyl acetate copolymer was 44 mole %, the ethylene pressure was 60 kg/cm² and the catalyst was 60 ppm; (2) in the second solution adding step, the boron concentration of the second solution was 300 ppm and the weight ratio of the second solution comprising boron acid and sodium acetate to the EVOH copolymer intermediate pellets was 1:1. The second EVOH copolymer was prepared separately from the first EVOH copolymer.

The separately prepared first EVOH copolymer and second EVOH copolymer were then combined by dry blending. Specifically, the respective EVOH copolymers were dry blended in an 80:20 weight ratio of the first EVOH copolymer to the second EVOH copolymer. The EVOH copolymers were placed into a plastic bag and then shaken. The dry blended mixture of EVOH copolymers was pelletized to produce the final pellets of Comparative EVOH 5 with moisture content of 0.15 wt. %. The boron content and the alkali metal content of the final EVOH copolymer resin composition were listed in table 2.

Example 12: Preparation of Comparative EVOH 6

Comparative EVOH 6 was prepared from a first EVOH copolymer and a second EVOH copolymer. The first EVOH copolymer was prepared according to the following steps:

Ethylene-Vinyl Acetate Copolymer Preparation Step:

A polymerization vessel equipped with a cooling coil was added 500 kg of vinyl acetate monomer, 100 kg of methanol, 70 ppm of diacetyl peroxide (catalyst), based on the weight of vinyl acetate monomer, and 0.015 kg of citric acid. After temporarily replacing the gaseous contents inside of the polymerization vessel with nitrogen, the nitrogen was replaced with ethylene and pressed until the ethylene pressure became 43 kg/cm². Under the ethylene pressure, the content in the polymerization vessel was brought to a temperature of 67° C. while being stirred to initiate polymerization. After 6 hours from the initiation of the polymerization where the polymerization rate reached 60%, 0.0525 kg of sorbic acid (acting as a polymerization inhibitor) was added. An ethylene-vinyl acetate copolymer having an ethylene content of 35 mole % was obtained. Then, the reaction liquid containing the ethylene-vinyl acetate copolymer was supplied to a distillation tower, and methanol vapor was introduced into the lower part of the tower to remove unreacted vinyl acetate monomer to obtain a methanol solution of a first EVAc copolymer.

Saponification Step:

The first EVAc copolymer was saponified with sodium hydroxide to reach a saponification of 99.5% to obtain a first EVOH copolymer intermediate. The first EVOH copolymer intermediate was then subsequently dissolved into a solution comprising methanol and water in a weight ratio of 60:40. After dissolving the first EVOH copolymer intermediate into the solution of methanol and water, the mixture had a 41 wt. % solid content of EVOH copolymer intermediate. The mixture of EVOH copolymer intermediate was maintained at a temperature of about 60° C. for one hour.

Pelletization Step:

The mixture of the EVOH copolymer intermediate, containing methanol and water, was then pelletized using underwater pelletization. Specifically, the mixture of methanol, water, and the EVOH copolymer intermediate was pumped into feeding tube with a flow rate of 120 L/min. The mixture was transferred to an inlet pipe, which had a diameter of 2.8 mm, cut by a rotating knife at a speed of 1,500 rpm, and then cooled by adding water having a temperature of 5° C. and subsequently centrifuged to produce pellets from the prepared EVOH copolymer intermediates.

First Solution Addition Step:

The EVOH copolymer intermediate pellets were washed with water and then immersed into a first solution comprising boron acid and sodium acetate. The first solution that the EVOH copolymer intermediate pellets were immersed in had a boron concentration of about 550 ppm and weight ratio of the first solution comprising boron acid and sodium acetate to the EVOH copolymer intermediate pellets was 1.8:1. Then, the final first EVOH copolymer was formed.

The second EVOH copolymer was prepared according to steps similar to those described above for first EVOH copolymer, except that: (1) in the EVAc copolymer preparation step, the ethylene content of the ethylene-vinyl acetate copolymer was 42 mole %, the ethylene pressure was 58 kg/cm² and the catalyst was 30 ppm; (2) in the second solution adding step, the boron concentration of the second solution was 130 ppm and the weight ratio of the second solution comprising boron acid and sodium acetate to the EVOH copolymer intermediate pellets was 1:1. The second EVOH copolymer was prepared separately from the first EVOH copolymer.

The separately prepared first EVOH copolymer and second EVOH copolymer were then combined by dry blending. Specifically, the respective EVOH copolymers were combined in a 50:50 weight ratio of the first EVOH copolymer to the second EVOH copolymer and then were mixed thoroughly with a conical screw mixer (CM-2; SHE HUI MACHINERY CO., LTD.) for 5 minutes at a mixing speed of 10 rpm. The mixture of the first EVOH copolymer and the second EVOH copolymer was dried to form the final pellets of Comparative EVOH 6 with moisture content of 0.15 wt. %. The boron content and the alkali metal content of the final EVOH copolymer resin composition were listed in table 2.

Example 13: Preparation of Comparative EVOH 7

Comparative EVOH 7 was prepared from a first EVOH copolymer and a second EVOH copolymer. The first EVOH copolymer was prepared according to the following steps:

Ethylene-Vinyl Acetate Copolymer Preparation Step:

A polymerization vessel equipped with a cooling coil was added 500 kg of vinyl acetate monomer, 100 kg of methanol, 70 ppm of diacetyl peroxide (catalyst), based on the weight of vinyl acetate monomer, and 0.015 kg of citric acid. After temporarily replacing the gaseous contents inside of the polymerization vessel with nitrogen, the nitrogen was replaced with ethylene and pressed until the ethylene pressure became 60 kg/cm$^2$. Under the ethylene pressure, the content in the polymerization vessel was brought to a temperature of 67° C. while being stirred to initiate polymerization. After 6 hours from the initiation of the polymerization where the degree of polymerization reached 60%, 0.0525 kg of sorbic acid (acting as a polymerization inhibitor) was added. An ethylene-vinyl acetate copolymer having an ethylene content of 44 mole % was obtained. The reaction liquid containing the ethylene-vinyl acetate copolymer was then supplied to a distillation tower, and methanol vapor was introduced into the lower part of the tower to remove unreacted vinyl acetate monomer to obtain a methanol solution of a first EVAc copolymer.

Saponification Step:

The first EVAc copolymer was saponified with sodium hydroxide to reach a saponification of 99.5% to obtain a first EVOH copolymer. The first EVOH copolymer intermediate was then subsequently dissolved into a solution comprising methanol and water in a weight ratio of 60:40. After dissolving the first EVOH copolymer intermediate into the solution of methanol and water, the mixture had a 41 wt. % solid content of EVOH copolymer intermediate. The mixture of EVOH copolymer intermediate was maintained at a temperature of about 60° C. for one hour.

Pelletization Step:

The mixture of the EVOH copolymer intermediate, containing methanol and water, was then pelletized using underwater pelletization. Specifically, the mixture of methanol, water, and the EVOH copolymer intermediate was pumped into feeding tube with a flow rate of 120 L/min. The mixture was transferred to an inlet pipe, which had a diameter of 2.8 mm, cut by a rotating knife at a speed of 1,500 rpm, and then cooled by adding water having a temperature of 5° C. and subsequently centrifuged to produce pellets from the prepared EVOH copolymer intermediates.

First Solution Addition Step:

The EVOH copolymer intermediate pellets were washed with water and then immersed into a first solution comprising sodium acetate with the concentration. The first solution that the EVOH copolymer intermediate pellets were immersed in had a boron concentration of about 0 ppm and weight ratio of the first solution comprising sodium acetate to the EVOH copolymer intermediate pellets was 1:1. Then, the final first EVOH copolymer was formed.

The second EVOH copolymer was prepared according to steps similar to those described above for the first EVOH copolymer, except that: (1) in the EVAc copolymer preparation step, the ethylene content of the ethylene-vinyl acetate copolymer was 44 mole %, the ethylene pressure was 60 kg/cm$^2$ and the catalyst was 20 ppm; (2) in the second solution adding step, the boron concentration of the second solution was 500 ppm and the weight ratio of the second solution comprising boron acid and sodium acetate to the EVOH copolymer intermediate pellets was 1.5:1. The second EVOH copolymer was prepared separately from the first EVOH copolymer.

The separately prepared first EVOH copolymer and second EVOH copolymer were then combined by compounding. Specifically, the respective EVOH copolymers were compounded in a 90:10 weight ratio of the first EVOH copolymer and the second EVOH copolymer and extruded by a Zenix ZPT-32HT twin screw extruder, which was commercially available from Zenix Industrial Co., LTD., with a screw having a length/diameter (L/D) 20 mm/mm, a rotation speed of 10 rpm, and a cylinder temperature profile as shown below to produce the final pellets of Comparative EVOH 7 with moisture content of 0.15 wt. %. The boron content and the alkali metal content of the final EVOH copolymer resin composition were listed in table 2.

| Twin extruder processing temperature(° C.) | | | | | | | | | | | | |
| --- | --- | --- | --- | --- | --- | --- | --- | --- | --- | --- | --- | --- |
| 1 zone | 2 zone | 3 zone | 4 zone | 5 zone | 6 zone | 7 zone | 8 zone | 9 zone | 10 zone | 11 zone | 12 zone | 13 zone |
| 190 | 195 | 195 | 200 | 205 | 205 | 210 | 210 | 215 | 220 | 220 | 220 | 220 |

Test Example 1

Example EVOHs 1-6 and Comparative EVOHs 1-7 were evaluated to assess certain properties, including the melt flow rate (MFR), the melting point temperatures, and the coefficient of determination. Additionally, the EVOH copolymers were evaluated before being mixed to produce Example EVOHs 1-6 and Comparative EVOHs 1-7.

A summary of the melt flow rates (MFR) of Example EVOHs 1-6 and Comparative EVOHs 1-7 as well as the EVOH copolymers to produce the Example and Comparative EVOHs is presented in Table 1 below. The maximum MFR and minimum MFR assess the rheological behavior of the EVOH copolymers at a single shear rate. An example of how to calculate the maximum MFR and minimum MFR can be found in Chinese Patent No. 1264914 C, which is incorporated herein in its entirety for all purposes. The maximum MFR divided by the minimum MFR of the first EVOH copolymer used to produce the Example and Comparative EVOHs is shown in Table 1 below. (unit of MFR: g/10 min)

TABLE 1

| | MFR of $1^{st}$ EVOH copolymer (before mixing) | Max/Min MFR of $1^{st}$ EVOH copolymer (before mixing) | MFR of $2^{nd}$ EVOH copolymer (before mixing) | MFR of $3^{rd}$ EVOH copolymer (before mixing) | MFR of final EVOH copolymer resin composition |
|---|---|---|---|---|---|
| Ex. EVOH 1 | 3 | 1.3 | 4.2 | — | 3.8 |
| Ex. EVOH 2 | 9 | 1.2 | 3.8 | — | 4.4 |
| Ex. EVOH 3 | 2.1 | 1.3 | 4.6 | — | 3.2 |
| Ex. EVOH 4 | 0.8 | 1.5 | 12.2 | — | 3.6 |
| Ex. EVOH 5 | 3.4 | 1.2 | 0.8 | — | 3.6 |
| Ex. EVOH 6 | 4.6 | 1.5 | 5.5 | 6.1 | 5.7 |
| Comp. EVOH 1 | 2.8 | 1.3 | 4 | — | 3.8 |
| Comp. EVOH 2 | 8.8 | 1.1 | 1.6 | — | 6.2 |
| Comp. EVOH 3 | 22.1 | 1.4 | 0.8 | — | 10.1 |
| Comp. EVOH 4 | 1.2 | 1.8 | 2.2 | — | 1.8 |
| Comp. EVOH 5 | 3.4 | 1.2 | 4 | — | 3.7 |
| Comp. EVOH 6 | 4.2 | 1.1 | 4.4 | — | 4.2 |
| Comp. EVOH 7 | 2.2 | 1.3 | 2.5 | — | 2.4 |

Specifically, EVOH resin compositions at Example EVOHs 1-6 and Comparative EVOHs 1-7 were each loaded into a twin-bore capillary rheometer. The twin-bore capillary rheometer was a RH7 Flowmaster Twin-bore Capillary Rheometer, which is available from Malvern Instruments LTD. The die was a 1-mm diameter capillary, L/D=20. The long die had an inner hole diameter at 1 mm and a length at 20 mm. An orifice die (also referred to as a zero die) having an inner hole diameter at 1 mm and a length at 0.25 mm was used to measure the pressure drop at the hole entrance. The twin-bore capillary rheometer had a bore size at 15 mm, max force at 50 kN, and used a testing temperature at 210° C. The pressure sensor was an Ultra-MAX-HT, model no. UMHT3-6-M-X-18-D8-30M-B. Rosand Rheometer Control software, Version 8.6, was used for running and assessing the readings of the twin-bore capillary rheometer.

The EVOH resin compositions of Example EVOHs 1-6 and Comparative EVOHs 1-7 as well as the EVOH copolymers used to produce the Example EVOHs 1-6 and Comparative EVOHs 1-7 were loaded into the long die on the test side and into the zero die on the blank side. The device was heated to a temperature of 210° C., maintained the temperature for 30 minutes, and then the sample was filed into the twin-bore capillary rheometer. Pressure was then moderately applied to allow air between the materials to be discharged. After the EVOH resin compositions were melted for 9 minutes, the shear rate was set to be 99 s$^{-1}$ and the rheological properties were measured. Specifically, the viscosity was evaluated from about 1500 seconds to about 4500 seconds as extrusion starting from the twin-bore capillary rheometer. The viscosity at every 120 seconds was then plotted and a regression line was derived from the plotted points. A coefficient of determination was then calculated from the plotted viscosity points.

A coefficient of determination may be calculated using the following formula:

$$R^2=\Sigma(\hat{Y}-\overline{Y})^2/\Sigma(Y-\hat{Y})^2$$

wherein,
$R^2$=coefficient of determination,
$\hat{Y}$=the y-value on the regression line,
$\overline{Y}$=the average of y-value corresponding to the respective x-value on the plotted graph, and
Y=the y-value corresponding to the respective x-value on the plotted graph.

The coefficient of determination ($R^2$) generally refers to the proportion of y-values that can be fitted by the plotted regression line. For example, if the coefficient of determination ($R^2$) is 0.92, then 92% of the y-values are affected by the regression line of x-values. The y-value of the graph corresponds to the shear viscosity. Thus, if the coefficient of determination ($R^2$) is in a certain range, the rheological behavior is expected to be stable.

FIG. 1 represents the coefficient of determination ($R^2$) of Example EVOH 4 and Comparative EVOH 6 which plot the shear viscosity versus time, wherein the EVOH copolymer resin compositions were tested by rheometer under 210° C. and shear rate of 99 s$^{-1}$. The coefficient of determination ($R^2$) of Example EVOH 4 is larger than or equal to 0.5 and less than or equal to 1. When $R^2$ becomes closer to 1, the shear viscosity becomes more stable and the thickness of the film thereof becomes uniform.

The melting points of EVOH copolymers used to produce the Example and Comparative EVOHs were determined using the method of ISO 11357-3-2011 with a DSC Q200 device (The Tzero lid was a TA Instrument T 170607 and the Tzero pan was a TA Instrument T 170620).

To evaluate the boron content, a sample solution was prepared by pellets for each of Example EVOHs 1-6 and Comparative EVOHs 1-7 by breaking down 0.2 g of the respective EVOH copolymer resin composition pellets in concentrated 10 ml nitric acid in conjunction with heating by a microwave. The resulting sample solution was then diluted with pure water to 50 ml. The boron amount contained in the prepared solution was measured by Inductively Coupled Plasma optical emission spectrometry (ICP-OES). The specific device used for ICP-OES was a ThermoFisher iCAP7000 device, produced by THERMOFISHER SCIENTIFIC. The boron content of EVOH copolymer resin composition measured by ICP-OES corresponded to the amount of boron derived from the boron compounds incorporated into the respective EVOH copolymers.

The alkali metal content was also determined for the respective EVOH copolymer resin composition. In particular, 2 g of the respective EVOH copolymer resin composition was placed into a platinum dish, a few milliliters of sulfuric acid were added, and then the platinum dish having the EVOH copolymer resin composition and sulfuric acid was heated with a gas burner. After confirming that the EVOH copolymer resin composition was carbonized and the white smoke caused by sulfuric acid disappeared, few drops of sulfuric acid were added and the combination of carbonized EVOH copolymer resin composition and sulfuric acid were reheated. This operation was repeated until the organic matter disappeared, and the resulting material was completely ash. The platinum dish was then left to cool, and 1 mL of hydrochloric acid was added to dissolve the ash. The hydrochloric acid solution containing the ash was washed with ultrapure water and then diluted to 50 mL. The alkali metal content in the sample solution was measured with an inductively coupled plasma spectrometer (ICP-AES) (manufactured by Agilent Technology, Model 720-ES). Finally, the alkali metal concentration in the solution was converted into the alkali metal content in the EVOH copolymer resin composition.

The melting points of EVOH copolymers used to produce the Example and Comparative EVOHs, the slope of regression line, the coefficient of determination, content of boron, and content of alkali metal of Example EVOHs 1-6 and Comparative EVOHs 1-7 are shown in Table 2, below.

TABLE 2

|  | $1^{st}$ $T_m$ (° C.) | $2^{nd}$ $T_m$ (° C.) | $3^{rd}$ $T_m$ (° C.) | Regression Line (Slope) | Coefficient of Determination | Boron (ppm) | Alkali Metal (ppm) |
|---|---|---|---|---|---|---|---|
| Ex. EVOH 1 | 183 | 165 | — | 0.13 | 0.85 | 220 | 20 |
| Ex. EVOH 2 | 195 | 159 | — | 0.32 | 0.52 | 80 | 60 |
| Ex. EVOH 3 | 174 | 159 | — | 0.49 | 0.99 | 90 | 110 |
| Ex. EVOH 4 | 187 | 174 | — | 0.049 | 0.79 | 120 | 210 |
| Ex. EVOH 5 | 187 | 187 | — | −0.47 | 0.63 | 150 | 360 |
| Ex. EVOH 6 | 195 | 183 | 165 | −0.11 | 0.72 | 110 | 75 |
| Comp. EVOH 1 | 187 | 165 | — | 0.87 | 0.33 | 90 | 96 |
| Comp. EVOH 2 | 183 | 174 | — | 0.62 | 0.13 | 20 | 170 |
| Comp. EVOH 3 | 187 | 159 | — | −0.66 | 0.01 | 350 | 250 |
| Comp. EVOH 4 | 187 | 135 | — | −0.71 | 0.33 | 160 | 130 |
| Comp. EVOH 5 | 187 | 174 | — | 0.58 | 0.15 | 50 | 10 |
| Comp. EVOH 6 | 178 | 168 | — | −0.036 | 0.16 | 190 | 320 |
| Comp. EVOH 7 | 187 | 187 | — | 0.83 | 0.32 | 90 | 170 |

As noted above, the maximum MFR and minimum MFR only assessed the rheological behavior at the EVOH copolymers at a single shear rate. The MFR value also only assessed the overall rheological behavior at period time. Thus, controlling the maximum viscosity and the minimum viscosity cannot solve the problems addressed by the instant disclosure. However, the coefficients at determination represented each rheological behavior at different time under same shear rate which can better present the real situation in real processing procedure. So, the inventors believe that controlling certain coefficients at determination contributes to improved uniformity at thickness and excellent oxygen barrier properties for films formed from certain EVOH copolymer resin compositions according to aspects of the disclosure.

Test Example 2

Mono-layer films of Example EVOHs 1-6 and Comparative EVOHs 1-7 were evaluated to assess the uniformity of thickness and elongation of such mono-layer films. Specifically, pellets of Example EVOHs 1-6 and Comparative EVOHs 1-7 were fed into a single screw extruder to form films of Example EVOHs 1-6 and Comparative EVOHs 1-7 with approximately thickness of 20 μm and width of 15 cm. The thickness of film was determined using a TECLOCK thickness gauge, model no. SM-114. The standard deviation between the thickness of the film at the five randomly selected points was then determined. If the standard deviation is determined to be less than 0.3, the film is classified to be a film having superior uniformity of thickness (ranked as "○" in Table 3). If the standard deviation is determined to be from 0.3 to 0.5, the film is classified to be a film having suitable uniformity of thickness (ranked as "Δ" in Table 3). If the standard deviation is determined to be greater than 0.5, then the film is classified to be a film having inferior uniformity of thickness (ranked as "X" in Table 3).

To assess the oxygen transmission rate (OTR), the films with thickness of 20 μm made from Example EVOHs 1-6 and Comparative EVOHs 1-7 were assessed at five points using the method of ISO 14663-2 with a OXTRAN 2/22 device, available from MOCON. The temperature for analyzing the five points of the films with thickness of 20 μm was 20° C. and the relative humidity thereof was 65%. The units for the OTR values was $cm^3 * 20$ $um/m^2 * 24$ $hr*atm$. The assessed OTR values at the five points of the films with thickness of 20 μm were then averaged together to determine an overall OTR value for the respective films of Example EVOHs 1-6 and Comparative EVOHs 1-7.

To assess the elongation properties of Example EVOHs 1-6 and Comparative EVOHs 1-7, films having a thickness of 180 μm were produced from the pellets of Example EVOHs 1-6 and Comparative EVOHs 1-7 using a single screw extruder. The films of Example EVOHs 1-6 and Comparative EVOHs 1-7 were cut to samples each having a length of 30 mm and a width of 90 mm.

The samples of each film were maintained at a temperature of 130° C. for 30 minutes and then tested using procedure ASTM D882 at a pull rate of 1000 m/min. As a brief summary of the elongation testing procedure of ASTM D882, the samples were pulled in tension until failure using an AI-7000MT available from GOTECH. The elongation testing may be performed on a single column universal testing machine. In particular, the rates of elongation in the machine direction and in the tensile direction were determined for the films with thickness of 180 μm of Example EVOHs 1-6 and Comparative EVOHs 1-7.

A summary of the uniformity of thickness, the rate of elongation in the machine direction, the rate of elongation in the tensile direction, and the oxygen transfer rate for the films of Example EVOHs 1-6 and Comparative EVOHs 1-7 is provided below in Table 3.

TABLE 3

|  | Uniformity of Thickness | Rate of Elongation (%) in Machine Direction | Rate of Elongation (%) in Tensile Direction | OTR ($cm^3 * 20$ $um/m^2 * 24$ $hr * atm$) |
|---|---|---|---|---|
| Ex. EVOH 1 | ○ | 764 | 821 | 0.55 |
| Ex. EVOH 2 | Δ | 672 | 654 | 0.34 |
| Ex. EVOH 3 | ○ | 712 | 769 | 0.71 |
| Ex. EVOH 4 | ○ | 811 | 612 | 1.32 |
| Ex. EVOH 5 | ○ | 714 | 662 | 1.59 |
| Ex. EVOH 6 | ○ | 811 | 674 | 0.89 |
| Comp. EVOH 1 | X | 321 | 415 | 3.21 |
| Comp. EVOH 2 | X | 256 | 377 | 4.11 |
| Comp. EVOH 3 | X | 213 | 311 | 5.14 |
| Comp. EVOH 4 | X | 431 | 255 | 3.18 |
| Comp. EVOH 5 | X | 315 | 214 | 3.33 |
| Comp. EVOH 6 | X | 289 | 332 | 5.15 |
| Comp. EVOH 7 | X | 323 | 216 | 6.14 |

Multi-layer films were formed from each of the EVOH copolymer resin compositions of Exemplary EVOHs 1-6 and Comparative EVOHs 1-7 by co-extruding the respective EVOH pellets, polypropylene, and tie layers (e.g., ARKEMA OREVAC 18729). The multi-layer films (Example multi-layer films 1-6 and Comparative multi-layer films 1-7) each had 5 layers with the layer formed from EVOH copolymer resin composition (abbreviated as EVOH layer) sandwiched between two polypropylene layers. Tie layers were disposed between each side of the EVOH layer and one of the polypropylene layers. Specifically, EVOH layer (I), polypropylene layer (II), and tie layer (III) were fed into a five layer co-extruder to produce a multi-layer sheet having a structure represented by: (II)/(III)/(I)/(III)/(II), with thicknesses of 300/25/50/25/300 (μm), respectively. Multi-layer containers of Example EVOHs 1-6 and Comparative EVOHs 1-7 (abbreviated as multi-layer container E1 to E6 and C1 to C7) were obtained by thermoforming EVOH copolymer resin composition into the shape of containers (i.g. a cup container).

Please refer to FIG. 2. The multi-layer container 10 is in a shape of cup. The multi-layer container 10 has a standing surface 11 and a corner region 12. The standing surface 11 is the side surface of the multi-layer container 10 and the corner region 12 is the corner of standing surface 11 and bottom surface.

The column heading of "Thickness Deviation" refers to the difference in the thickness of the multi-layer film in each thermoformed multi-layer container E1 to E6 and C1 to C7 at the corner region as compared to the standing region, which was produced from Example multi-layer films 1-6 and Comparative multi-layer films 1-7. A "○" was given to EVOH layers having a thickness that differed between the corner region and the standing region by less than 20%. A "Δ" was given to EVOH layers having a thickness that differed between the corner region and the standing region by 20% to 40%. An "X" was given to EVOH layers having a thickness that differed between the corner region and the standing region by more than 40%.

TABLE 4

| Multi-layer Container | Thickness Deviation |
|---|---|
| Ex. Multilayer Films 1 | ○ |
| Ex. Multilayer Films 2 | ○ |
| Ex. Multilayer Films 3 | ○ |
| Ex. Multilayer Films 4 | ○ |
| Ex. Multilayer Films 5 | X |
| Ex. Multilayer Films 6 | ○ |
| Comp. Multilayer Films 1 | ○ |
| Comp. Multilayer Films 2 | ○ |
| Comp. Multilayer Films 3 | ○ |
| Comp. Multilayer Films 4 | ○ |
| Comp. Multilayer Films 5 | ○ |
| Comp. Multilayer Films 6 | X |
| Comp. Multilayer Films 7 | X |

From Table 4, it is believed that Example multi-layer film made from Example EVOH 5 has greater thickness deviation because the ethylene contents in the first EVAc copolymer and the second EVAc copolymer are the same. A high ethylene content EVOH copolymer can improve the tensile strength and low ethylene content EVOH copolymer can improve the hydrogen bonding. Thus, that the first EVAc copolymer and the second EVAc copolymer having different ethylene contents in an EVOH copolymer resin composition may be able to further enhance the thermoformability.

What is claimed is:

1. An ethylene-vinyl alcohol copolymer resin composition comprising:
a first ethylene-vinyl alcohol copolymer having a first ethylene content and a second ethylene-vinyl alcohol copolymer having a second ethylene content, wherein the first ethylene content is the same as the second ethylene content; and
a coefficient of determination of viscosity of 0.5 to 1 at a shear rate of 99 s$^{-1}$ and a temperature of 210° C.

2. The ethylene-vinyl alcohol copolymer resin composition of claim 1, wherein the viscosity of the ethylene-vinyl alcohol copolymer resin composition at a temperature of 210° C. and a shear rate of 99 s$^{-1}$ is plotted over a time period from 1500 seconds to 4500 seconds and has a slope of regression line from −1 to 1.

3. The ethylene-vinyl alcohol copolymer resin composition of claim 2, wherein the ethylene-vinyl alcohol copolymer resin composition has the slope of regression line from −0.5 to 0.5.

4. The ethylene-vinyl alcohol copolymer resin composition of claim 1, wherein the ethylene-vinyl alcohol copolymer resin composition has a melt flow rate from 1.0 g/10 min to 10.0 g/10 min.

5. The ethylene-vinyl alcohol copolymer resin composition of claim 1, wherein the ethylene-vinyl alcohol copolymer resin composition comprises a boron content from about 5 ppm to about 300 ppm.

6. The ethylene-vinyl alcohol copolymer resin composition of claim 1, wherein the ethylene-vinyl alcohol copolymer resin composition comprises an alkali metal content from about 5 ppm to about 380 ppm.

7. An ethylene-vinyl alcohol copolymer resin composition comprising:
a first ethylene-vinyl alcohol copolymer having a first ethylene content, a second ethylene-vinyl alcohol copolymer having a second ethylene content, and the first ethylene content is different from the second ethylene content; and
a coefficient of determination of viscosity of 0.5 to 1 at a shear rate of 99 s$^{-1}$ and a temperature of 210° C.

8. The ethylene-vinyl alcohol copolymer resin composition of claim 1, wherein the ethylene-vinyl alcohol copolymer resin composition comprises a first melting point and a second melting point.

9. The ethylene-vinyl alcohol copolymer resin composition of claim 7, wherein the ethylene-vinyl alcohol copolymer resin composition comprises a first melting point and a second melting point.

10. The ethylene-vinyl alcohol copolymer resin composition of claim 8, wherein the first melting point temperature ranges from 140° C. to 215° C. and the second melting point temperature ranges from 135° C. to 200° C.

11. The ethylene-vinyl alcohol copolymer resin composition of claim 9, wherein the first melting point temperature ranges from 170° C. to 215° C. and the second melting point temperature ranges from 135° C. to 190° C.

12. The ethylene-vinyl alcohol copolymer resin composition of claim 7, wherein the first ethylene content ranges from 20 mole % to 35 mole % and the second ethylene content ranges from 36 mole % to 65 mole %.

13. A multi-layer structure comprising:
(a) a layer formed from the ethylene-vinyl alcohol copolymer resin composition of claim 1;
(b) a polymer layer formed from a polymer other than the EVOH copolymer resin composition; and
(c) an adhesive layer;
wherein the adhesive layer is disposed between the layer formed from the ethylene-vinyl alcohol copolymer resin composition and the polymer layer.

14. The multi-layer structure of claim 13, wherein the polymer layer is selected from a polyethylene layer, a polyethylene-graft-maleic-anhydride layer, a polypropylene layer, and a nylon layer.

15. The multi-layer structure of claim 13, wherein the adhesive layer is a tie layer.

16. A multi-layer structure comprising:
   (a) a layer formed from the ethylene-vinyl alcohol copolymer resin composition of claim 7;
   (b) a polymer layer formed from a polymer other than the EVOH copolymer resin composition; and
   (c) an adhesive layer;

wherein the adhesive layer is disposed between the layer formed from the ethylene-vinyl alcohol copolymer resin composition and the polymer layer.

17. The multi-layer structure of claim 16, wherein the polymer layer is selected from a polyethylene layer, a polyethylene-graft-maleic-anhydride layer, a polypropylene layer, and a nylon layer.

18. The multi-layer structure of claim 16, wherein the adhesive layer is a tie layer.

* * * * *